(12) United States Patent
Dunning et al.

(10) Patent No.: US 11,194,744 B2
(45) Date of Patent: Dec. 7, 2021

(54) IN-LINE MEMORY MODULE (IMM) COMPUTING NODE WITH AN EMBEDDED PROCESSOR(S) TO SUPPORT LOCAL PROCESSING OF MEMORY-BASED OPERATIONS FOR LOWER LATENCY AND REDUCED POWER CONSUMPTION

(71) Applicant: Qualcomm Intelligent Solutions, Inc., San Diego, CA (US)

(72) Inventors: David Stewart Dunning, Portland, OR (US); Shekhar Yeshwant Borkar, Beaverton, OR (US); Nitin Yeshwant Borkar, Redmond, WA (US); Matthew Scott Radecic, San Diego, CA (US)

(73) Assignee: Qualcomm Intelligent Solutions, Inc, San Diego, CA (US)

( * ) Notice: Subject to any disclaimer, the term of this patent is extended or adjusted under 35 U.S.C. 154(b) by 0 days.

(21) Appl. No.: 16/820,572

(22) Filed: Mar. 16, 2020

(65) Prior Publication Data
US 2021/0286740 A1 Sep. 16, 2021

(51) Int. Cl.
*G06F 13/16* (2006.01)
*G06F 15/78* (2006.01)
*G06F 13/40* (2006.01)

(52) U.S. Cl.
CPC ...... *G06F 13/1668* (2013.01); *G06F 13/4027* (2013.01); *G06F 15/7821* (2013.01)

(58) Field of Classification Search
CPC .................. G06F 13/1668; G06F 15/7821
See application file for complete search history.

(56) References Cited

U.S. PATENT DOCUMENTS

2019/0354292 A1* 11/2019 O .................... G06F 3/0611

OTHER PUBLICATIONS

Choe, J. et al., "Attacking Memory-Hard scrypt with Near-Data-Processing," Proceedings of the International Symposium on Memory Systems (MEMSYS '19), Sep. 30-Oct. 3, 2019, Washington, DC, USA, ACM, 5 pages.

(Continued)

*Primary Examiner* — Zachary K Huson
(74) *Attorney, Agent, or Firm* — Withrow & Terranova, PLLC

(57) ABSTRACT

In-line memory module (IMM) computing nodes with an embedded processor(s) to support local processing of memory-based operations for lower latency and reduced power consumption, and related methods are disclosed. The IMM computing node that includes one or more memory chips mounted on a circuit board. The IMM computing node also includes one or more embedded processor(s) on the circuit board that are each interfaced to at least one memory chip among the one or more memory chips. The processor(s) can be configured to access its interfaced memory chip(s) through an internal memory bus on the circuit board to perform processing onboard the IMM computing node in an offload computing access mode. The embedded processors(s) can also be configured to forward memory access requests received from an external processor to the memory chip(s) for data storage and retrieval in a transparent access mode without further local processing of the memory access requests.

22 Claims, 15 Drawing Sheets

(56) References Cited

OTHER PUBLICATIONS

Imani, M. et al., "Digital-based Processing In-Memory: A Highly-Parallel Accelerator for Data Intensive Applications," Proceedings of the International Symposium on Memory Systems (MEMSYS '19), Sep. 30-Oct. 3, 2019, Washington, DC, USA, ACM, 3 pages.
Li, J. et al., "PIMS: A Lightweight Processing-in-Memory Accelerator for Stencil Computations," Proceedings of the International Symposium on Memory Systems (MEMSYS '19), Sep. 30-Oct. 3, 2019, Washington, DC, USA, ACM, 12 pages.
Nguyen et al., "A Computation-In-Memory Accelerator Based on Resistive Devices," Proceedings of the International Symposium on Memory Systems (MEMSYS '19), Sep. 30-Oct. 3, 2019, Washington, DC, USA, ACM, 14 pages.
Rheindt, S. et al., "NEMESYS: Near-Memory Graph Copy Enhanced System-Software," Proceedings of the International Symposium on Memory Systems (MEMSYS '19), Sep. 30-Oct. 3, 2019, Washington, DC, USA, ACM, 16 pages.
Venkatesh, R.S. et al., "Fast In-Memory CRIU for Docker Containers," Proceedings of the International Symposium on Memory Systems (MEMSYS '19), Sep. 30-Oct. 3, 2019, Washington, DC, USA, ACM, 13 pages.

\* cited by examiner

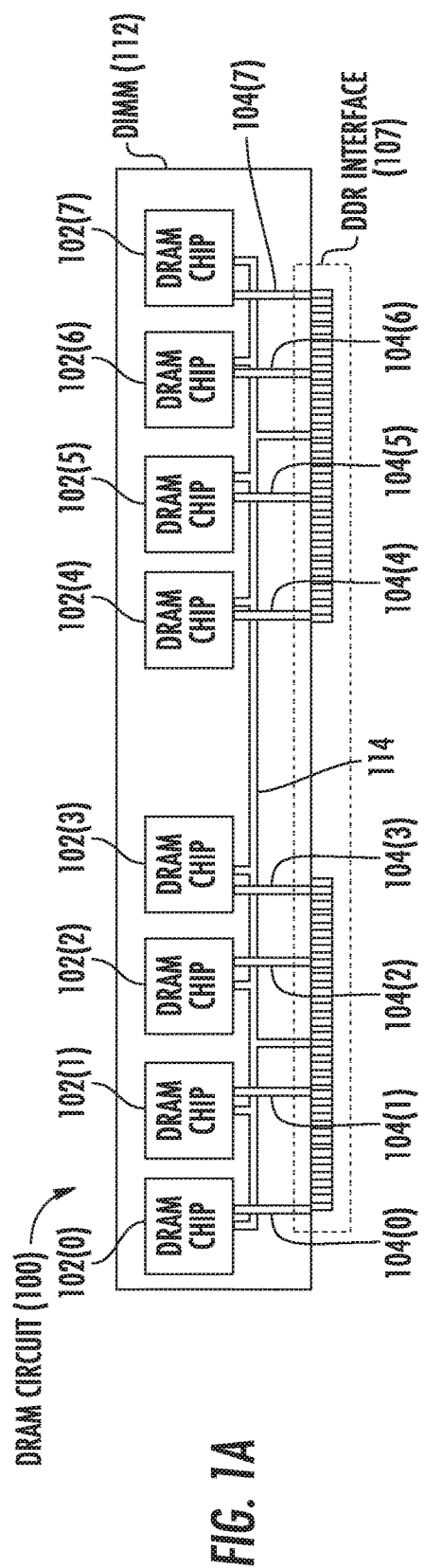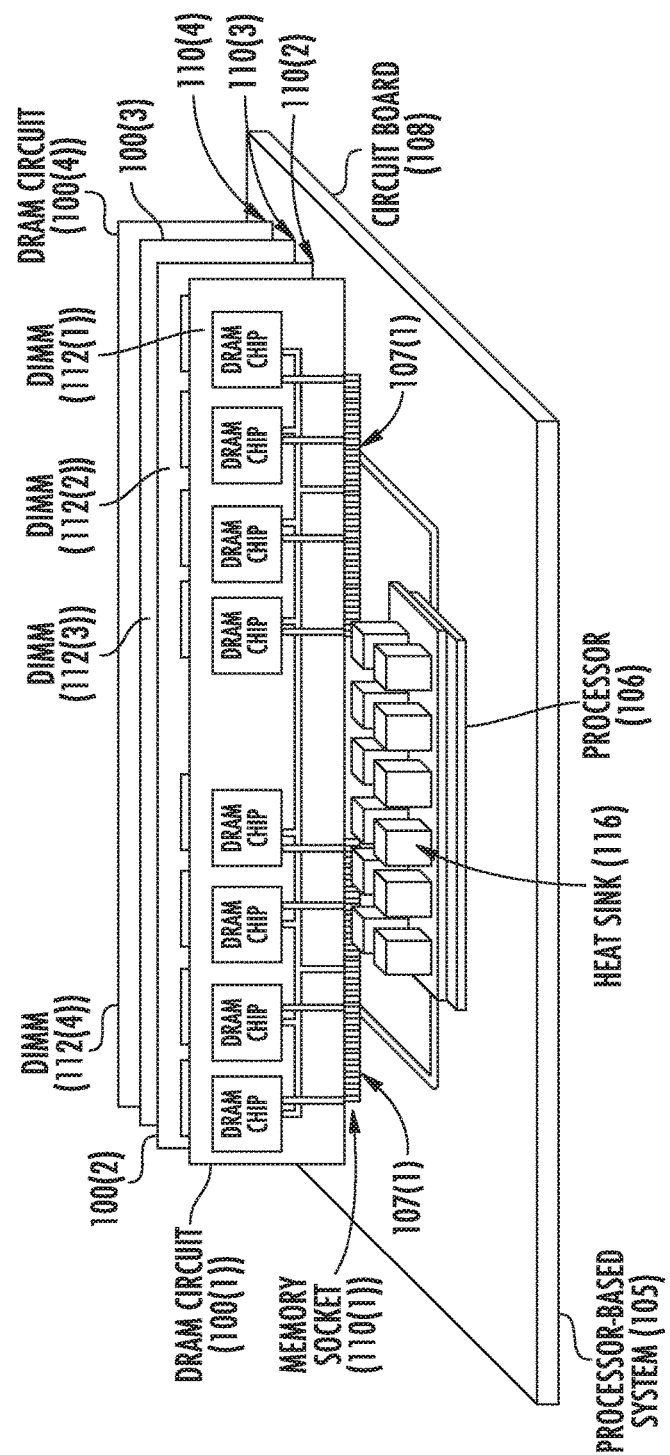

```
802 {long int *offload_data    // address of the offload data memory space
804 {for(i=0;i<data-size,i++) offload-data[i]=local-data[i]  // upload data
806 {long int *off_program;     // address of offload program
808 {for(i=0;i<pgm_size,i++) off_program[i]=local_program[i]  // upload program
810 {csr=Tag & Start_address & Processor_on_IMM & IMM & 0x01 //start offload engine
812 {while(csr_done_bit_not_set) wait;  // wait for completion for polling, or wait for interrupt
814 {for(i=0;i<data_size,i++)  local_data[i]=offload_results[i]  // get results
```

FIG. 8

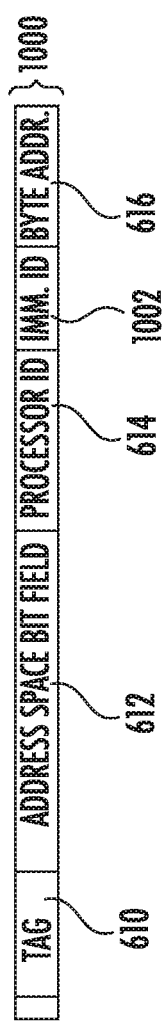
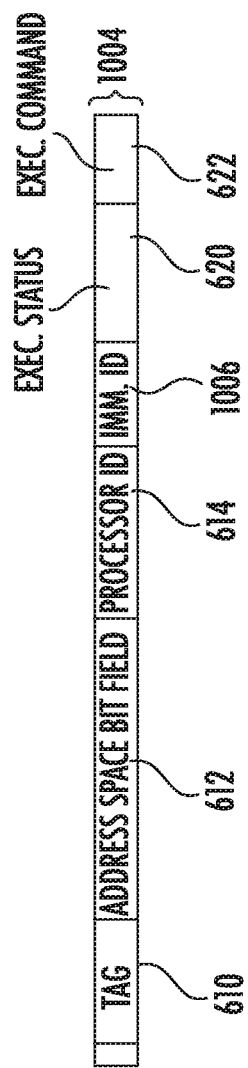
FIG. 10A
FIG. 10B

```
for (all DIMMS) {
    for (all processors on each DIMM) {
1108    long int *data // address of the offload data memory space
1110    for(i=0;i<data_size,i++) data[i]=local_data[i]   // upload data
1112    long int *node_program;  // address of program on the node
1114    for(i=0;i<pgm_size;i++) node_program[i]=local_program[i]  // upload program
    }
}
for(all DIMMS & processors on each DIMM) {
1120    csr=Tag & Start_address & Processor_on_DIMM & DIMM & 0x01  // start execution
}
while(csr_done_bit_not_set) wait;   // wait for completion for polling, or wait for interrupt
for(i=0;i<data_size,i++) local_data[i]=results[i]   // get results
```

FIG. 11

IN-LINE MEMORY MODULE (IMM) COMPUTING NODE WITH AN EMBEDDED PROCESSOR(S) TO SUPPORT LOCAL PROCESSING OF MEMORY-BASED OPERATIONS FOR LOWER LATENCY AND REDUCED POWER CONSUMPTION

STATEMENT OF GOVERNMENT SUPPORT

This invention was made with Government support under Agreement No. HR0011-17-3-0005, awarded by DARPA. The Government has certain rights in the invention.

BACKGROUND

I. Field of the Disclosure

The technology of the disclosure relates to a processor-based system that includes a processor for executing computer software, and more particularly to use of dual in-line memory modules (DIMMs) in the processor-based system.

II. Background

Central processing units (CPUs), also known as microprocessors, perform computational tasks in a wide variety of applications. The CPU is typically provided in a processor-based system that includes other components, such as a system memory for storing data and/or software instructions. A typical CPU includes one or more processor(s) each configured to execute software instructions. The software instructions can instruct a processor to fetch data from a location in the system memory (e.g., a dynamic random-access memory (DRAM)) as part of a memory read operation, perform one or more CPU operations using the fetched/read data, and generate a result. The generated result may then be stored back into the system memory as a memory write operation as part of the instruction's execution in a processor.

Dynamic random-access memory (DRAM) is a common form of computer memory that can be used as a system memory in a processor-based system, for example. In a DRAM, individual bits of data are stored in individual memory bit cells comprised of a transistor and a capacitor pair. A DRAM is an electrical circuit that consists of a memory array of DRAM bit cells. A DRAM can be provided in an integrated circuit (IC) chip, which is referred to as a "DRAM chip." A DRAM chip may be implemented using a common die that provides four (4), eight (8) data, or sixteen (16) pins (referred to herein as "×4" or "4-bit-wide," "×8" or "8-bit-wide," and "×16" or "16-bit-wide," respectively) for input and output. The amount of data that can be transferred into and out of the DRAM chip is a function of the number of data pins in use and the "burst length" of the DRAM chip. To provide a wider data bit width, a number of DRAM chips can be included in a DRAM circuit and arranged in a parallel configuration.

For example, FIG. 1A illustrates a DRAM circuit 100 that includes eight (8)×8 DRAM chips 102(0)-102(7) each having its own dedicated, non-shared 8-bit data bus 104(0)-104(7) to support a 64-bit width. FIG. 1B illustrates a processor-based system 105 that includes a processor 106 mounted on a circuit board 108. The processor 106 is interfaced to a plurality of memory sockets 110(1)-110(4) receiving respective DRAM circuits 100(1)-100(4) each like the DRAM circuit 100 in FIG. 1A to provide a system memory for the processor 106. The DRAM circuits 100(1)-100(4) in FIG. 1B are also shown in FIG. 1B as being packaged as dual in-line memory modules (DIMMs) 112(1)-112(4). A DIMM is common packaging and form factor used for DRAM circuits. The DRAM chips 102(0)-102(7) in each respective DRAM circuit 100(1)-100(4) provide a "memory rank" or "rank" to a memory controller to support a memory access through a respective DDR interface 107 for DIMM 112 in FIG. 1A and shown as DDR interface 107(1) for DIMM 112(1) in FIG. 1B. As shown in FIG. 1A, the DDR interface 107 of the DIMM 112 includes a common address/control bus 114 coupled to each DRAM chip 102(0)-102(7). If the DRAM chips 102(0)-102(7) support a burst size of eight (8), each DRAM chip 102(0)-102(7) can burst eight (8) bytes (8 B) per access such that the DRAM circuit 100 can support a 64-byte (64 B) data transfer per access. The DRAM chips 102(0)-102(7) in the respective DRAM circuits 100(1)-100(4) can be double data rate (DDR) DRAM chips that enable data transfer on both the rising and falling edges of a clock signal, thus doubling data bus bandwidth at a given clock frequency. Thus, a 64 B data transfer can be provided by each DRAM circuit 100(1)-100(4) in four (4) clock cycles with eight (8) total clock signal transitions.

The circuit board 108 in FIG. 1B supporting the processor-based system 105 partitions the processor 106 physically separate from the memory sockets 110(1)-110(4) receiving the DRAM circuits 100(1)-100(4) to allow room for a heat sink 116 provided on the processor 106 to dissipate heat. The power consumption of the processor 106 (e.g., >10 Watts (W)) may be much higher than the combined power consumption of the DRAM circuits 100(1)-100(4) (e.g., <10 W). Thus, the memory sockets 110(1)-110(4) can be located close together on the circuit board 108 such that the DRAM circuits 100(1)-100(4) are located in close proximity to each other without heat being an issue.

SUMMARY OF THE DISCLOSURE

Aspects disclosed herein include an in-line memory module (IMM) computing node with an embedded processor(s) to support local processing of memory-based operations for lower latency and reduced power consumption. Related methods are also disclosed. The IMM computing node includes one or more memory chips as integrated circuits (IC) mounted on a circuit board. For example, the memory chips could be dynamic random-access memory (RAM) (DRAM) memory chips. The IMM computing node also includes an external interconnect that includes an external memory bus coupled to an external memory interface that includes electrical conducting pins to exchange signals for memory accesses. In exemplary aspects disclosed herein, the IMM computing node also includes one or more embedded processor(s) on the circuit board of the IMM computing node that are each interfaced to the external interconnect. The embedded processor(s) are also coupled to an internal memory bus on the circuit board that is coupled to at least one interfaced memory chip among the one or more memory chips. As an example, by locating the embedded processor(s) in close physical proximity to their interfaced memory chips in the IMM computing node, memory latency for local processing may be reduced. The embedded processor(s) can be configured to perform local processing onboard the IMM computing node using its interfaced memory chip(s) in the IMM for memory. The IMM computing node can be interfaced to an external CPU or other system to allow the CPU or other system to offload processing onto the IMM computing module as an offloading engine for efficiency reasons and improve overall performance through reduced memory access latency.

As one example, an embedded processor in the IMM computing node can be configured to receive external commands through the external interconnect from an external processor or system. The embedded processor can then perform local processing on the IMM computing node offloaded from the external processor or system in an offload computing access mode based on received external commands from the external processor or system. For example, in an offload computing access mode, an embedded processor can be configured to receive data sent by an external processor or system through the external interconnect and then store this received data in interfaced memory chip(s). The embedded processor can then be instructed by commands received through the external interconnect by the external processor or system to perform offloaded computing operations on the stored data in its interfaced memory chip(s). As an alternative example, the embedded processor can be commanded by the external processor or system through embedded commands (e.g., semaphores) in the received data that is stored by the embedded processor in its interfaced memory chip(s). The embedded commands can be retrieved by the embedded processor from its interface memory chip(s) to perform offloaded computing operations based on the stored data on the IMM computing node. As yet another alternative example, an embedded processor in the IMM computing node can also be configured to receive data and software instructions from an external processor or system and store such instructions in its interfaced memory chip(s). The stored software instructions can then be fetched and executed by the embedded processor based on the stored data to perform offloaded computing operations on the IMM computing node.

In another example, an embedded processor in the IMM computing node can also be configured to simply forward memory access requests received on the external interconnect from an external processor or system to its interfaced memory chip(s) for data storage in a transparent access mode without further local processing of the memory access requests. In this example, the memory chip(s) act as a system memory for the external processor or system.

In this regard, in one exemplary aspect, an IMM computing node comprising a circuit board is provided. The circuit board of the IMM computing node includes a plurality of memory chips. The circuit board of the IMM computing node also includes an internal memory bus that comprises a plurality of internal data buses each coupled to a dedicated memory chip among the plurality of memory chips in a parallel configuration, and at least one internal address/control bus coupled to the plurality of memory chips. The circuit board of the IMM computing node also includes one or more embedded processors each coupled to a dedicated internal address/control bus among the at least one internal address/control bus and each coupled to at least one dedicated internal data bus among the plurality of internal data buses, to interface with at least one dedicated memory chip among the plurality of memory chips. The circuit board of the IMM computing node also includes an external interconnect that comprises a plurality of external data buses each assigned to a memory chip among the plurality of memory chips and coupled to the one or more processors, and an external address/control bus coupled to the one or more processors.

In another exemplary aspect, a method of performing a memory access IMM computing node is provided. The IMM computing node comprises a circuit board. The circuit board of the IMM computing node includes a plurality of memory chips. The circuit board of the IMM computing node also includes an internal memory bus that comprises a plurality of internal data buses each coupled to a dedicated memory chip among the plurality of memory chips in a parallel configuration, and at least one internal address/control bus coupled to the plurality of memory chips. The circuit board of the IMM computing node also includes at least one processor each coupled to at least one assigned internal address/control bus among the at least one internal address/control bus and each coupled to at least one assigned internal data bus among the plurality of internal data buses, to interface with at least one assigned memory chip among the plurality of memory chips. The circuit board of the IMM computing node also includes an external interconnect that comprises a plurality of external data buses each assigned to a memory chip among the plurality of memory chips and coupled to the at least one processor, and an external address/control bus coupled to the at least one processor. The process comprises a processor among the at least one processor receiving a command comprising an external memory address on an external address/control bus, and accessing the plurality of memory chips through the at least one internal address/control bus based on the received command.

In another exemplary aspect, a computer system is provided. The computer system includes an offload computer. The offload computer includes a main circuit board that includes a memory interconnect backplane, a plurality of IMM interconnects coupled to the memory interconnect backplane, and a plurality of IMM computing nodes each coupled to a respective IMM interconnect. Each IMM computing node of the plurality of IMM computing nodes comprises a circuit board. The circuit board of the IMM computing node includes a plurality of memory chips. The circuit board of the IMM computing node also includes an internal memory bus that comprises a plurality of internal data buses each coupled to a dedicated memory chip among the plurality of memory chips in a parallel configuration, and at least one internal address/control bus coupled to the plurality of memory chips. The circuit board of the IMM computing node also includes one or more embedded processors each coupled to at least one assigned internal address/control bus among the at least one internal address/control bus and each coupled to at least one assigned internal data bus among the plurality of internal data buses, to interface with at least one dedicated memory chip among the plurality of memory chips. The circuit board of the IMM computing node also includes an external interconnect coupled to an IMM interconnect among the plurality of IMM interconnects. The external interconnect comprises a plurality of external data buses each assigned to a memory chip among the plurality of memory chips and coupled to the at least one processor, and an external address/control bus coupled to the at least one processor.

BRIEF DESCRIPTION OF THE FIGURES

FIG. 1A is a diagram of a dynamic random-access memory (RAM) (DRAM) dual in-line memory module (DIMM);

FIG. 1B is a diagram of a processor-based system that includes a processor and a plurality of the DIMMs in FIG. 1A to provide a system memory accessible by the processor;

FIG. 8 is an exemplary computer software code listing for a host processor in the computer system in FIG. 5 offloading data and computer software instructions to an embedded processor in the IMM computing node to be loaded into the memory chip(s) and interfaced to the embedded processor, and the embedded processor accessing the instructions in its interfaced memory chip(s) to be executed on the offloaded data;

FIGS. 10A and 10B are diagrams of exemplary command formats that can be used by the host processor in the computer system in FIG. 5 to address the memory space of embedded processors in an IMM computing node in the computer in FIG. 9;

FIG. 11 is an exemplary computer software code listing for a host processor offloading data and computer software instructions to an embedded processor in the IMM computing node in the computer in FIG. 9 to be loaded into the memory chip(s) and interfaced to the embedded processor, and the embedded processor accessing the instructions in its interfaced memory chip(s) to be executed on the offloaded data;

DETAILED DESCRIPTION

Figure 2:
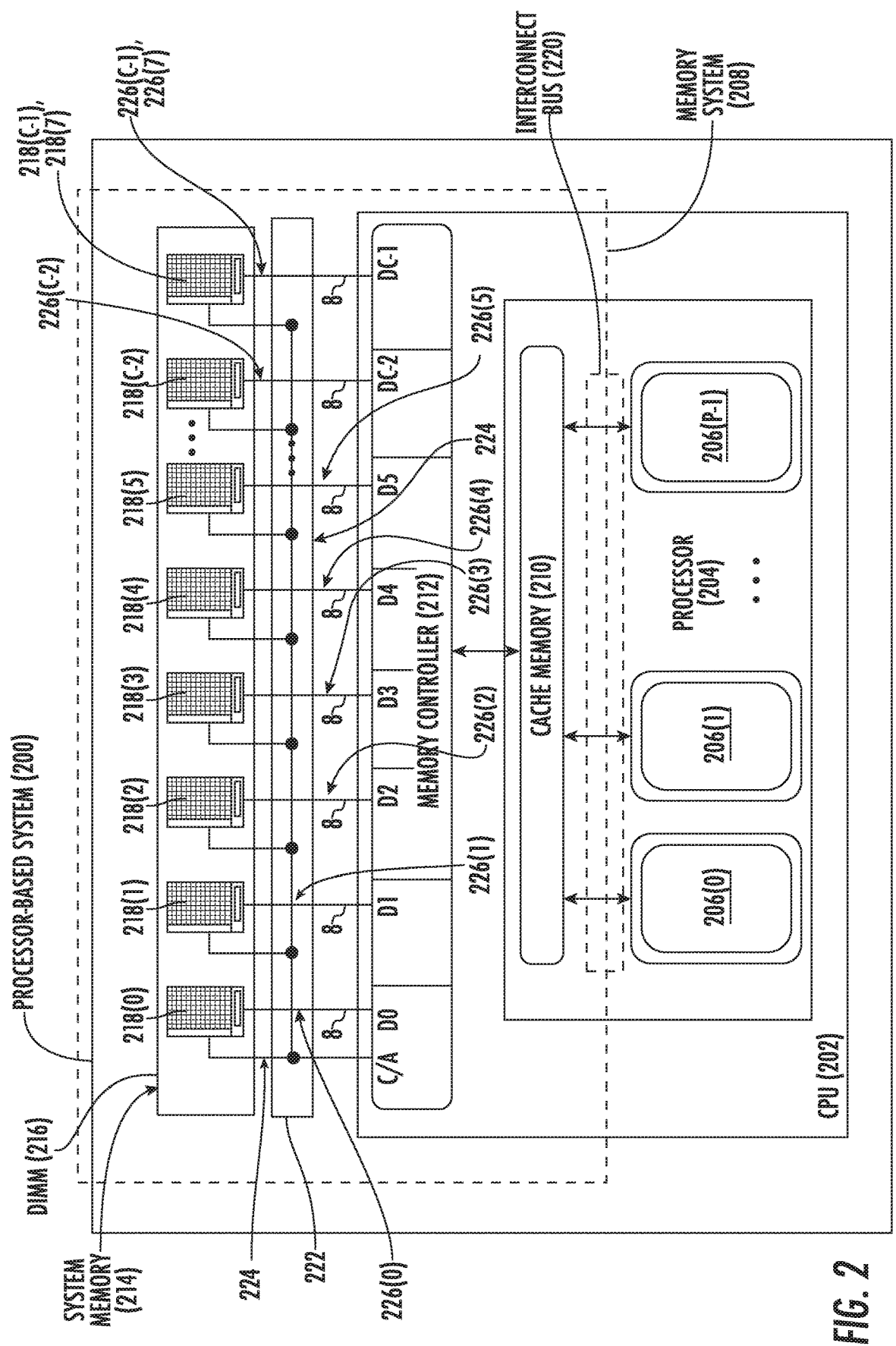
FIG. 2 is a diagram of an exemplary processor-based system that includes a central processing unit (CPU) with a processor that includes a memory system that includes a memory controller, cache memory, and a DIMM to provide a system memory.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include an in-line memory module (IMM) computing node with an embedded processor(s) to support local processing of memory-based operations for lower latency and reduced power consumption. Related methods are also disclosed. The IMM computing node includes one or more memory chips as integrated circuits (IC) mounted on a circuit board. For example, the memory chips could be dynamic random-access memory (RAM) (DRAM) memory chips. The IMM computing node also includes an external interconnect that includes an external memory bus coupled to an external memory interface that includes electrical conducting pins to exchange signals for memory accesses. In exemplary aspects disclosed herein, the IMM computing node also includes one or more embedded processor(s) on the circuit board of the IMM computing node that are each interfaced to the external interconnect. The embedded processor(s) are also coupled to an internal memory bus on the circuit board that is coupled to at least one interfaced memory chip among the one or more memory chips. As an example, by locating the embedded processor(s) in close physical proximity to their interfaced memory chips in the IMM computing node, memory latency for local processing may be reduced. The embedded processor(s) can be configured to perform local processing onboard the IMM computing node using its interfaced memory chip(s) in the IMM for memory. The IMM computing node can be interfaced to an external CPU or other system to allow the CPU or other system to offload processing onto the IMM computing node as an offloading engine for efficiency reasons and improve overall performance through reduced memory access latency.

As one example, an embedded processor in the IMM computing node can be configured to receive external commands through the external interconnect from an external processor or system. The embedded processor can then perform local processing on the IMM computing node offloaded from the external processor or system in an offload computing access mode based on received external commands from the external processor or system. For example, in an offload computing access mode, an embedded processor can be configured to receive data sent by an external processor or system through the external interconnect and then store this received data in interfaced memory chip(s). The embedded processor can then be instructed by commands received through the external interconnect by the external processor or system to perform offloaded computing operations on the stored data in its interfaced memory chip(s). As an alternative example, the embedded processor can be commanded by the external processor or system through embedded commands (e.g., semaphores) in the received data that is stored by the embedded processor in its interfaced memory chip(s). The embedded commands can be retrieved by the embedded processor from its interface memory chip(s) to perform offloaded computing operations based on the stored data on the IMM computing node. As yet another alternative example, an embedded processor in the IMM computing node can also be configured to receive data and software instructions from an external processor or system and store such instructions in its interfaced memory chip(s). The stored software instructions can then be fetched and executed by the embedded processor based on the stored data to perform offloaded computing operations on the IMM computing node.

In another example, an embedded processor in the IMM computing node can also be configured to simply forward memory access requests received on the external interconnect from an external processor or system to its interfaced memory chip(s) for data storage in a transparent access mode without further local processing of the memory access requests. In this example, the memory chip(s) act as a system memory for the external processor or system.

Figure 3:
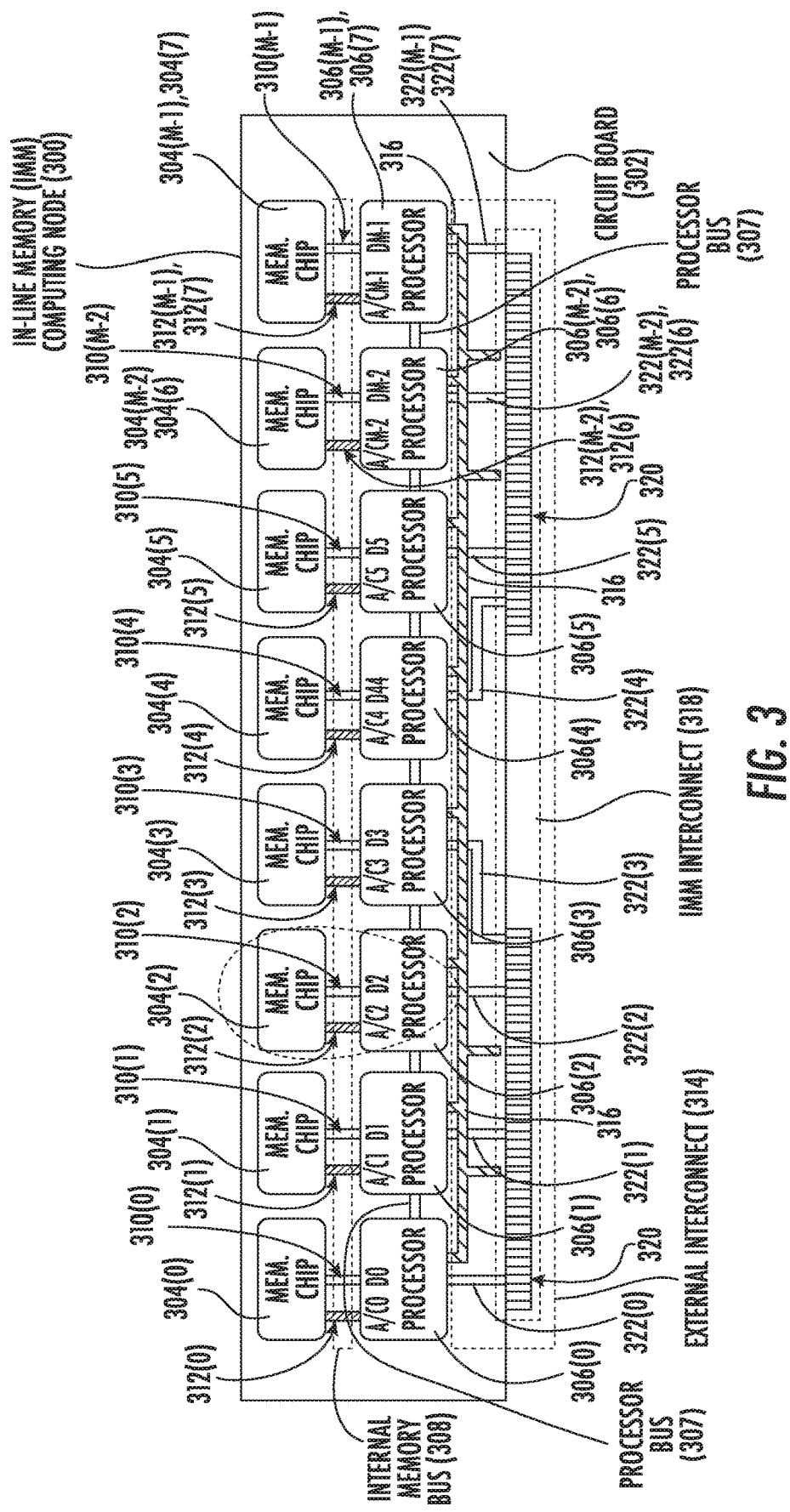
FIG. 3 is a diagram of an exemplary in-line memory module (IMM) computing node that includes a circuit board with a plurality of memory chips and embedded processors each associated with a respective interfaced memory chip(s), wherein the embedded processors are configured to interface with their respective interfaced memory chip(s) through a local memory bus(es) to perform memory-based tasks.

Before discussing examples of IMM computing nodes having an embedded processor(s) to support local processing of memory-based operations for lower latency and reduced power consumption starting at FIG. 3, an exemplary processor-based system that includes a central processing unit (CPU) with a processor that includes a memory system that includes a dual in-line memory module (DIMM) is first discussed with regard to FIG. 2.

In this regard, FIG. 2 is a diagram of an exemplary processor-based system 200 that includes a CPU 202 that includes a processor 204. The processor 204 includes 'P' number of processor cores 206(0)-206(P−1) in this example, wherein 'P' is equal to any number of processor cores 206(0)-206(P−1) desired. The processor-based system 200 also includes a memory system 208 that includes a cache memory 210, a memory controller 212, and a system memory 214 that includes a DIMM 216. One DIMM 216 is shown, but note that system memory 214 could include multiple DIMMs. The processor 204 is conventionally partitioned from the DIMM 216 on a motherboard or other circuit board. The DIMM includes 'C' number of parallel-arranged memory chips 218(0)-218(C−1). The memory chips 218(0)-218(C−1) in the DIMM 216 are dynamic random-access memory (RAM) (DRAM) chips. A memory read request by a processor core 206(0)-206(P−1) is first communicated through an interconnect bus 220 to the cache memory 210. If the memory read request results in a cache miss to the cache memory 210, the memory controller 212 is instructed to fetch the requested data through a memory interconnect 222 to the DIMM 216. The memory interconnect 222 includes an electrical interface for a common address/control bus 224 and data buses 226(0)-226(C−1) to be routed between the processor 204 and the respective memory chips 218(0)-218(C−1) in the DIMM 216. In this example, a common shared address/control bus 224 is provided in the memory interconnect 222 and routed to each memory chip 218(0)-218(C−1). Dedicated data buses 226(0)-226(C−1) are provided in the memory interconnect 222 and routed to each respective memory chip 218(0)-218(C−1).

The memory controller 212 is configured to receive read data at a specified memory address in memory chips 218(0)-218(C−1) asserted on the data buses 226(0)-226(C−1) in response to a memory read access asserted on the address/control bus 224. The memory controller 212 is configured to assert write data on the data buses 226(0)-226(C−1) to be written to a specified memory address in memory chips 218(0)-218(C−1) in response to a memory write access asserted on the address/control bus 224. The memory controller 212 receives and aggregates data received on the data buses 226(0)-226(C−1) from an addressed respective memory chip 218(0)-218(C−1) for a memory read access.

In the example of the processor-based system 200 in FIG. 2, the data buses 226(0)-226(C−1) are each eight (8) bits wide, because the memory chips 218(0)-218(C−1) each have an eight (8) bit data width as a non-limiting example. This means the memory chips 218(0)-218(C−1) are configured to each read and write eight (8) bits from and onto their respective data buses 226(0)-226(C−1) at a given time in response to a clock signal. If the memory chips 218(0)-218(C−1) are double data rate (DDR) memory chips, such as DDR DRAM chips, the memory chips 218(0)-218(C−1) are configured to assert/receive eight (8) bits to/from their respective data buses 226(0)-226(C−1) on both a rising edge and falling edge of a clock signal. Also in this example, and as shown in FIG. 2, the memory chips 218(0)-218(C−1) may be configured to perform a memory burst of eight (8) bits as an example. Thus, over a period of four (4) clock cycles, the memory chips 218(0)-218(C−1) can assert/receive eight (8) bits or one (1) byte (1 B) to/from their respective data buses 226(0)-226(C−1) on the respective rising edges and falling edges of four (4) clock signals for a total of eight (8) bytes (B) (8 B). Thus, for eight (8) memory chips 218(0)-218(7) included in the DIMM 216, the memory controller 212 activating each of the memory chips 218(0)-218(7) in parallel for a memory read operation in burst mode would cause a total of 64 B (i.e., 8 B×8 memory chips 218(0)-218(7)) to be asserted on the respective data buses 226(0)-226(7).

Thus, as shown in the processor-based system in FIG. 2, the processor 204 controls the reading of data from and the writing of data to DIMM 216 based on execution of software instructions. The software instructions are processed by the processor 204. The processor 204 is partitioned from the DIMM 216 on a motherboard or other circuit board to facilitate dissipating heat generated by the processor 204 during its operation. However, for classes of computing that are more memory access intensive than computing activity intensive, the power consumed by the processor 204 may be much lower than the power consumption by the DIMM 216. In these classes of workloads, the partitioning of the processor 204 from the DIMM 216, like shown in FIG. 2, may be unnecessary. Partitioning the processor 204 from the DIMM 216 increases the routing distance between the processor 204 and the DIMM 216, which contributes to the memory access latency of the system memory 214 and therefore can reduce CPU 202 performance. Energy consumption of the CPU 202 may also be increased by this partitioning of the processor 204 from the DIMM 216.

In this regard, FIG. 3 is a diagram of an exemplary in-line memory module (IMM) computing node 300 that is an electrical circuit and that includes a circuit board 302 with 'M' number of memory chips 304(0)-304(M−1). The memory chips 304(0)-304(M−1) provide memory, and can serve as memory for a CPU in a processor-based system like the CPU 202 in FIG. 2, as a non-limiting example. For example, the memory chips 304(0)-304(M−1) could be a dynamic random-access memory (RAM) (DRAM) memory chips. However, unlike the DIMM 216 in FIG. 2, the IMM computing node 300 in FIG. 3 includes a plurality of 'M' processors 306(0)-306(M−1) in this example. In this example, the processors 306(0)-306(M−1) are included or embedded on the same circuit board 302 as the memory chips 304(0)-304(M−1). Also in this example, there are eight (8) memory chips 304(0)-304(7), and eight (8) embedded processors 306(0)-306(7).

Embedding the processors 306(0)-306(M−1) on the same circuit board 302 as the memory chips 304(0)-304(M−1) allows the processors 306(0)-306(M−1) to be located in closer physical proximity to the memory chips 304(0)-304(M−1). This can reduce memory access latencies between the processors 306(0)-306(M−1) and the memory chips 304(0)-304(M−1) when performing memory related operations. As will be discussed in more detail below, the processors 306(0)-306(M−1) are each coupled to a respective interfaced memory chip 304(0)-304(M−1) in this example to perform memory-based tasks onboard the IMM computing node 300. The processors 306(0)-306(M−1) can be configured to perform local processing onboard the IMM computing node 300 using its interfaced memory chips 304(0)-304(M−1) in the IMM computing node 300 as memory. The IMM computing node 300 can be interfaced to an external CPU or other system to allow the CPU or other system to offload processing onto the IMM computing node 300 as an offloading engine for efficiency reasons and improve overall performance through reduced memory access latency. The processors 306(0)-306(M−1) can also be coupled to each other through a processor bus 307, which may be coupled to an external memory controller for example.

With continuing reference to FIG. 3, to couple the memory chips 304(0)-304(M−1) to the processors 306(0)-306(M−1), the IMM computing node 300 includes an internal memory bus 308. The internal memory bus 308 includes an 'M' number of internal data buses 310(0)-310(M−1) in this example to provide a non-shared, dedicated internal data bus (D0-DM−1) 310(0)-310(M−1) for each respective memory chip 304(0)-304(M−1) in a parallel configuration. In this manner, the IMM computing node 300 supports parallelization of data access with the memory chips 304(0)-304(M−1) to support an overall data bit width according to the formula Y=M×X, wherein 'Y' is overall data bit width, 'X' is the data bit width of each memory chip 304(0)-304(M−1), and 'M' is the number of memory chips 304(0)-304(M−1). For example, if each memory chip 304(0)-304(M−1) has an 'X' data bit width of eight (8) bits, and there are eight (8) memory chips 304(0)-304(7), the IMM computing node 300 would support a 'Y' data bit width of 64 bits. Data to be written by a processor 306(0)-306(M−1) to its dedicated respective memory chip 304(0)-304(M−1) is asserted on the respective internal data bus 310(0)-310(M−1) coupled between such processor 306(0)-306(M−1) and its dedicated respective memory chip 304(0)-304(M−1). The internal memory bus 308 also includes 'M' number of internal address/control buses (A/C0-A/CM−1) 312(0)-312(M−1) to provide a non-shared, dedicated internal address/control bus 312(0)-312(M−1) for each respective memory chip 304(0)-304(M−1). The internal address/control buses 312(0)-312(M−1) allow each respective processor 306(0)-306(M−1) to control and address memory accesses to each of its respective dedicated memory chips 304(0)-304(M−1) in this example. Thus, the processors 306(0)-306(M−1) are coupled and interfaced to respective memory chips 304(0)-304(M−1) through the respective internal address/control buses 312(0)-312(M−1) and internal data buses 310(0)-310(M−1). This allows the processors 306(0)-306(M−1) to use the respective memory chips 304(0)-304(M−1) as memory for processing tasks performed by the processors 306(0)-306(M−1) onboard the IMM computing node 300.

Note that although the internal memory bus 308 of the IMM computing node 300 in FIG. 3 includes a separate, non-shared internal address/control bus 312(0)-312(M−1) between each respective memory chip 304(0)-304(M−1) and its respective processors 306(0)-306(M−1), this is not required. For example, and as will be discussed in other examples herein, an internal address/control bus could be shared between multiple processors and/or memory chips. The processors 306(0)-306(M−1) included in the IMM computing node 300 will be configured to access the memory chips 304(0)-304(M−1) based on the architecture of the internal memory bus 308.

With continuing reference to FIG. 3, to provide external access to the IMM computing node 300 to receive memory requests and/or other commands that can be received by the processors 306(0)-306(M−1) to perform processing and other memory related tasks, the IMM computing node 300 also includes an external interconnect 314. For example, memory requests and/or other commands can be provided to the processors 306(0)-306(M−1) in the IMM computing node 300 to cause the processors 306(0)-306(M−1) to perform local processing on the IMM computing node 300 offloaded from another system. The external interconnect 314 includes a shared external address/control bus 316 in this example that is coupled to each of the processors 306(0)-306(M−1). The external address/control bus 316 is coupled to an IMM interconnect 318 that includes electrical conducting pins 320 configured to be coupled to a socket on a circuit board to interface the IMM computing node 300 with another processor or system. The external interconnect 314 also includes 'M' number of dedicated external data buses 322(0)-322(M−1) that are coupled to respective processors 306(0)-306(M−1) and are configured to transport data to and from the processors 306(0)-306(M−1) and their respective assigned memory chips 304(0)-304(M−1). In other words, in this example, the external data buses 322(0)-322(M−1) are assigned to each memory chip 304(0)-304(M−1).

Figure 4:
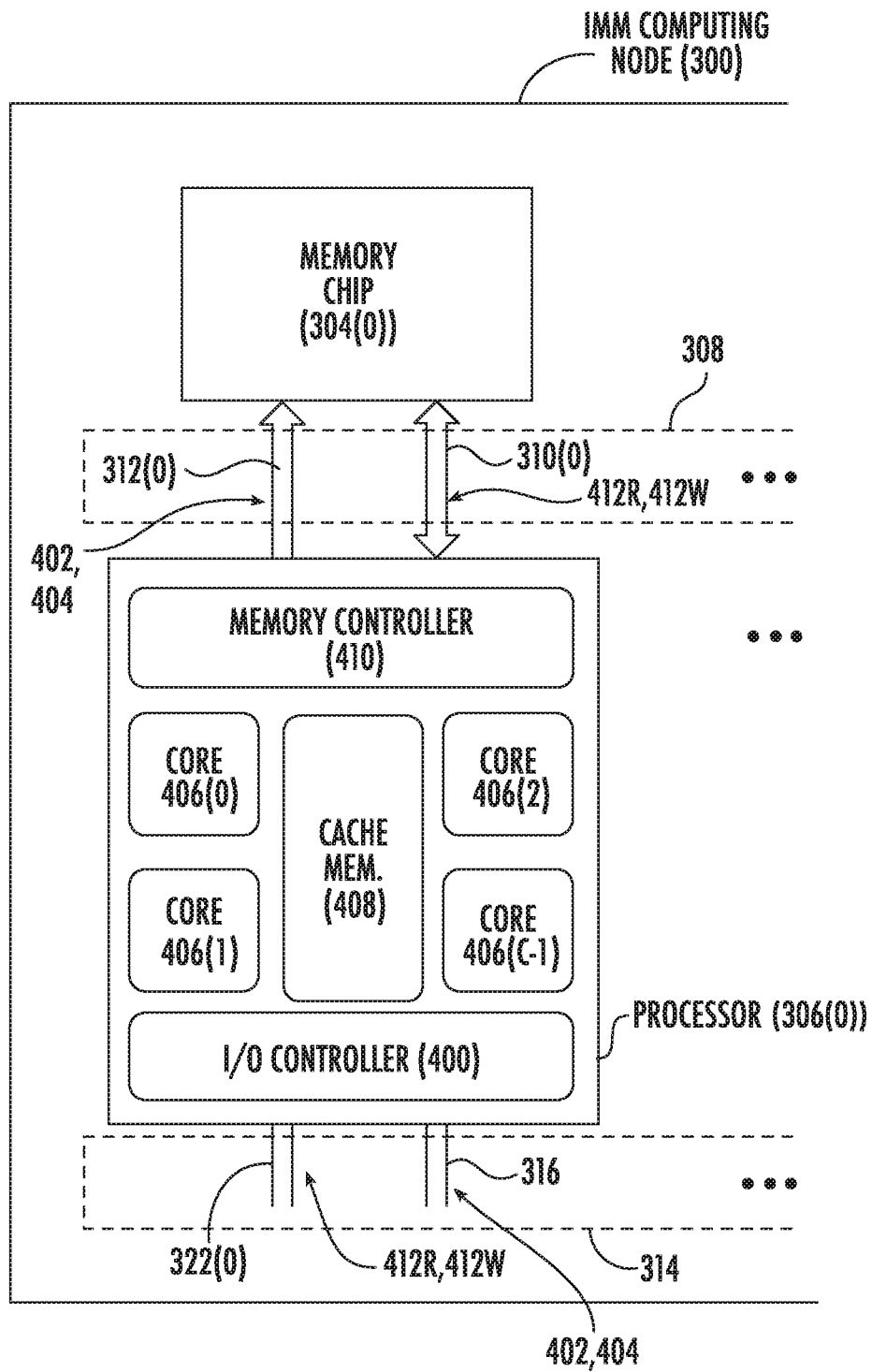
FIG. 4 is a diagram of an exemplary embedded processor and associated interfaced memory chip in the IMM computing node in FIG. 3.

Thus, for the IMM computing node 300 in FIG. 3, an external memory address and control information is asserted on the external address/control bus 316 of the external interconnect 314 to cause an identified processor 306(0)-306(M−1) to perform a memory access at the external memory address to its respective memory chip 304(0)-304(M−1). For example, the memory access can be a read or write memory access. For a memory read access, the processor 306(0)-306(M−1) will assert read data received on the internal data bus 310(0)-310(M−1) from its accessed memory chip 304(0)-304(M−1) onto its respective dedicated external data bus 322(0)-322(M−1). To illustrate and explain an exemplary memory read access in the IMM computing node 300 in FIG. 3, FIG. 4 is provided. FIG. 4 illustrates exemplary detail of the processor 306(0) interfaced to the external interconnect 314 and internal memory bus 308 in the IMM computing node 300 in FIG. 3. The detail of the processor 306(0) in FIG. 4 can also be applicable to the other processors 306(1)-306(M−1) in the IMM computing node 300.

In this regard, an input/output (I/O) controller 400 in the processor 306(0) coupled to the external interconnect 314 receives an external memory address 402 and control information 404 asserted on the external address/control bus 316 indicating a memory read request. The I/O controller 400 provides the memory read request to a processor core 406(0)-406(C−1). A processor core 406(0)-406(C−1) can check an internal cache memory 408 based on the external memory address 402 to determine if the requested read data is contained therein, and if so, the data can be provided to the external data bus 322(0). If the requested read data is not contained in the internal cache memory 408, the processor core 406(0)-406(C−1) can forward the memory read request to an internal memory controller 410 that can assert the external memory address 402 and control information 404 on the internal address/control bus 312(0) to access its dedicated memory chip 304(0). The requested read data 412R from the memory chip 304(0) is asserted on the internal address/control bus 312(0) to be received by the memory controller 410 of the processor 306(0). The processor 306(0) can then assert the read data 412R onto the external data bus 322(0).

For a memory write access, the I/O controller 400 in the processor 306(0) receives the external memory address 402 and control information 404 asserted on the external address/control bus 316 indicating a memory write request. The I/O controller 400 also receives the write data 412W to be written on the external data bus 322(0). The I/O controller 400 provides the memory write request to a processor core 406(0)-406(C−1). The processor core 406(0)-406(C−1) can forward the memory write request and write data 412W to the internal memory controller 410 that can assert the external memory address 402 and control information 404 on the internal address/control bus 312(0) and the write data 412W on the internal data bus 310(0). The write data 412W is received by the memory chip 304(0) and is written into memory based on the external memory address 402.

Figure 5:
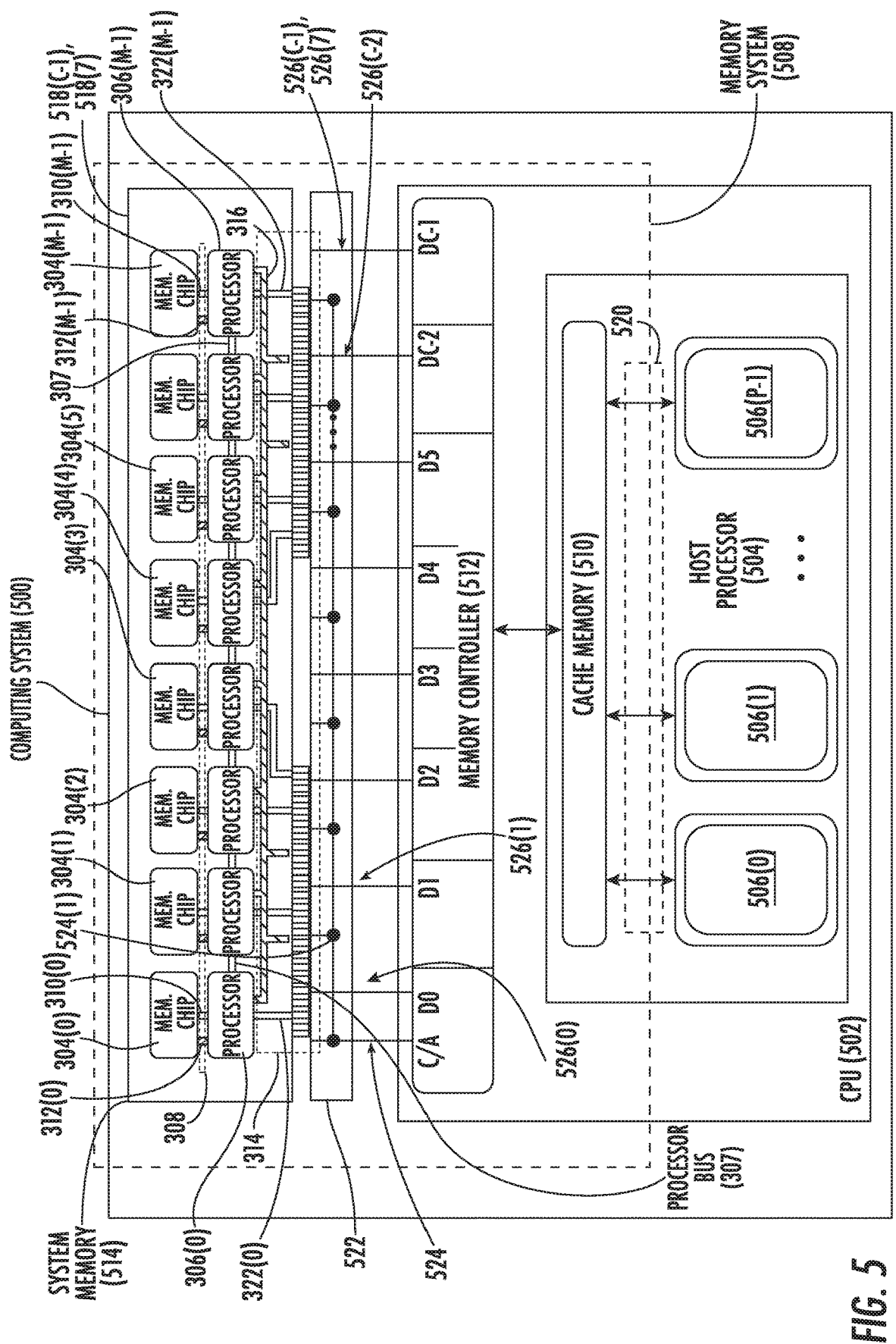
FIG. 5 is diagram of an exemplary computer system that includes a host processor interfaced to an IMM computing nodes like the IMM computing node in FIG. 3.

FIG. 5 is diagram of an exemplary computer system 500 that includes a CPU 502 that includes a host processor 504 interfaced to the IMM computing node 300 in FIG. 3. As discussed above, the IMM computing node 300 includes the embedded processor 306(0)-306(M−1) to support offloaded processing apart from the host processor 504 on the IMM computing node 300 itself in an offload computing mode. However, the computer system 500 can also be configured to access the IMM computing node 300 as a system memory in a transparent access mode. In a transparent access mode, the memory access requests from the host processor 504 can be issued to the IMM computing node 300 that are then simply forwarded by its respective processors 306(0)-306(M−1) to the memory chips 304(0)-304(M−1). Thus, by including the IMM computing node 300 in the computer system 500 in FIG. 5, the computer system 500 can use the IMM computing node 300 as an offload processor to perform offload processing and/or use the IMM computing node 300 as traditional system memory. In contrast, the example computer system 200 in FIG. 2 is only configured to access a DIMM 216 as the system memory 214, since the DIMM 216 does not include embedded processors like included the IMM computing node 300 in FIG. 3.

With reference to FIG. 5, the host processor 504 includes 'P' number of processor cores 506(0)-506(P−1) in this example, wherein 'P' is equal to any number of processor cores 506(0)-506(P−1) desired. The computer system 500 also includes a memory system 508 that includes a cache memory 510, a memory controller 512, and a system memory 514 that includes the IMM computing node 300. One IMM computing node 300 is shown, but note that the system memory 514 could include multiple IMM computing nodes 300, as will be discussed in other examples. A memory read request by a processor core 506(0)-506(P−1) is first communicated through an interconnect bus 520 to the cache memory 510. If the memory read request results in a cache miss to the cache memory 510, the memory controller 512 is instructed to fetch the requested data through a memory interconnect 522 to the IMM computing node 300. The memory interconnect 522 includes an electrical interface to an external interconnect 314 of the IMM computing node 300 to route an address/control bus 524 and data buses 526(0)-526(C−1) from the host processor 504 to a respective external address/control bus 316 and external data buses 322(0)-322(M−1) of the IMM computing node 300.

Figure 6A:
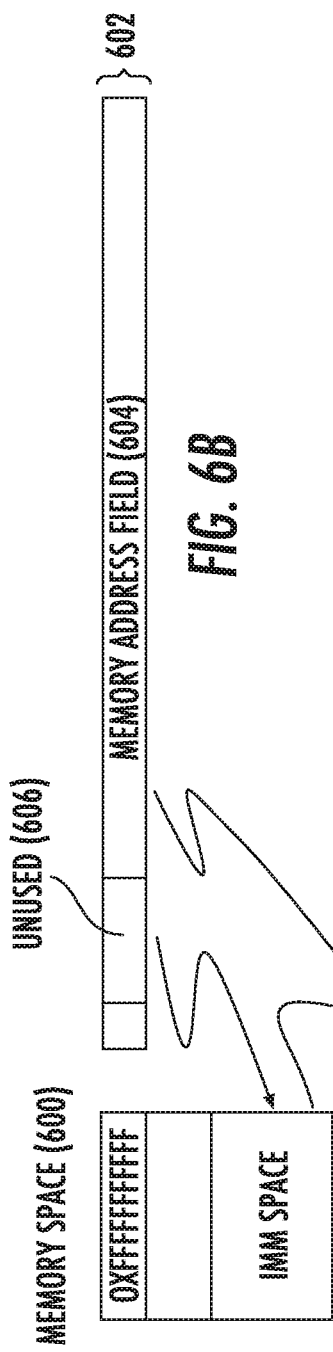
FIG. 6A is a diagram of a representation of exemplary memory space for an embedded processor in the IMM computing node in the computer system in FIG. 5.
Figure 6B:
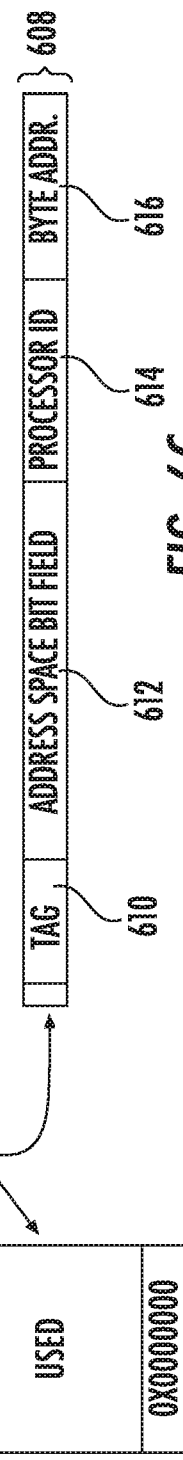
FIGS. 6B-6D are diagrams of exemplary command formats that can be used by the host processor in the computer system in FIG. 5 to address the memory space of embedded processors in the IMM computing node in FIG. 3.

The host processor 504 is configured to issue commands to the IMM computing node 300 to setup and instruct the IMM computing node 300 to perform offload processing in an offload computing mode. In this regard, FIG. 6A is a diagram of a representation of an exemplary memory space 600 for a processor 306(0)-306(M−1) in the IMM computing node 300. The host processor 504 is configured to issue a command in the form of address and control information that is routed by the memory controller 512 to the external address/control bus 316 and is destined for a particular processor 306(0)-306(M−1) to perform offloaded processing. FIG. 6B is an exemplary address/control word format 602 that is used by the host processor 504 to issue memory access requests. The address/control word format 602 includes a memory address bit field 604 that can be used to address memory. The address/control word format 602 includes an unused bit field 606 that can be used by the host processor 504 to address specific memory space of a processor 306(0)-306(M−1) in the IMM computing node 300.

Figure 6C:
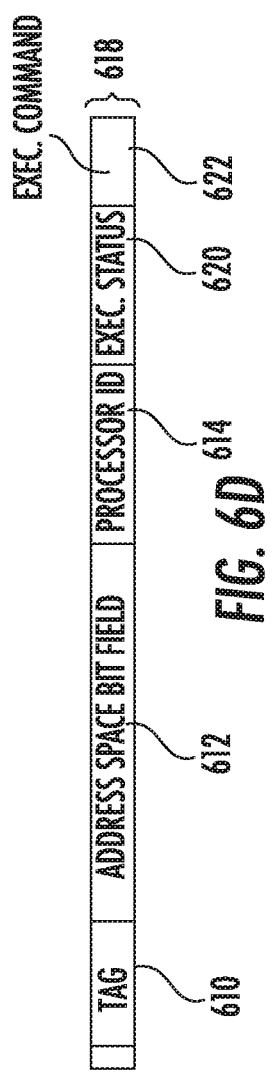

FIG. 6C illustrates a command address/control word format 608 that can be used by the host processor 504 to can issue a command to a processor 306(0)-306(M−1) in the IMM computing node 300 to perform offloaded processing. A tag field 610 in the upper address space that can be addressed by the command address/control word format 608 where the unused bit field was in the address/control word format 602 can be used to signify the unique address space of the address space of the processor 306(0)-306(M−1) to be accessed. The command address/control word format 608 also includes an address space bit field 612 that can be used by the host processor 504 to include an intended address to address space of the processor 306(0)-306(M−1), which can be thought of as an offset to the address space addressed in the tag field 610. That tag, the address in the tag field 610, and the address space bit field 612 form an external memory address to be used to address memory in a memory chip 304(0)-304(M−1) in the IMM computing node 300. The command address/control word format 608 also includes a processor identifier field 614 that can be used by the host processor 504 to identify the particular processor 306(0)-306(M−1) in the IMM computing node 300 to be addressed to receive a command from the host processor 504. The command address/control word format 608 also includes a byte address field 616 to allow for memory addressability as small as a single byte.

The host processor 504 in FIG. 5 can issue a command according to the command address/control word format 608 to address a specified address space of a particular processor 306(0)-306(M−1) in the MM computing node 300 to cause such processor 306(0)-306(M−1) to perform offload processing in an offload computing mode. In this regard, the host processor 504 in FIG. 5 is configured to issue a command according to the command address/control word format 608 through the memory controller 512 on the external address/control bus 316 to be received by the IMM computing node 300. The processors 306(0)-306(M−1) in the IMM computing node 300 are each configured to receive the command that includes an internal memory address in the tag field 610 and the address space bit field 612 of the command from the external address/control bus 316. If the command issued by the host processor 504 is a write command, the processors 306(0)-306(M−1) in the IMM computing node 300 are also each configured to receive write data for the command on the external data buses 322(0)-322(M−1). For example, as discussed in more detail below, the host processor 504 could issue write commands to a processor 306(0)-306(M−1) with instructions and data to be stored in the memory chip 304(0)-304(M−1) of such processor 306(0)-306(M−1) to then be used by the processor 306(0)-306(M−1) to perform computing tasks onboard the IMM computing node 300. The processors 306(0)-306(M−1) are configured to review the processor identifier in the processor identifier field 614 of the received command from the host processor 504 to determine if the command is addressed to such processor 306(0)-306(M−1). The addressed processor 306(0)-306(M−1) is then configured to assert the write data in the command from the host processor 504 on the internal data bus 310(0)-310(M−1) and the address/control information including the external memory address from the command on the internal address/control bus 312(0)-312(M−1) dedicated to the identified processor 306(0)-306(M−1).

The host processor 504 in the computer system 500 in FIG. 5 can be configured to issue a series of write commands according to the command address/control word format 608 in FIG. 6C, for example, to cause an identified processor 306(0)-306(M−1) to write the write data to its memory chip 304(0)-304(M−1) for later retrieval and processing. For example, this write data from the host processor 504 could be data that the processor 306(0)-306(M−1) processes through executing software instructions or hard instructions. Hard instructions mean specific circuitry that is configured to perform a specific task and that are not changed or reprogrammed. The software instructions could be internal to the processor 306(0)-306(M−1). Alternatively, the software instructions could also be provided by the host processor 504 to a processor 306(0)-306(M−1) to be loaded into its dedicated memory chip 304(0)-304(M−1) for later execution on the data also provided by the host processor 504 to the processor 306(0)-306(M−1) that are loaded into its dedicated memory chip 304(0)-304(M−1). As another alternative, instructions could be encoded as semaphores (embedded instructions) in write data issued by commands provided by the host processor 504 to a processor 306(0)-306(M−1) that are loaded into its dedicated memory chip 304(0)-304(M−1). In each of these scenarios, the host processor 504 is issued commands to a processor 306(0)-306(M−1) in the IMM computing node 300 to cause the processor 306(0)-306(M−1) to perform offloaded computing that the host processor 504 is not performing. The results of the offloaded computing can be stored in the dedicated memory chip 304(0)-304(M−1) of a processor 306(0)-306(M−1). The host processor 504 can access these resultant data through read commands to perform memory read accesses to the processors 306(0)-306(M−1).

It may be desired to provide another type of command format for the host processor 504 to instruct a particular processor 306(0)-306(M−1) in the IMM computing node 300 to start offloaded execution. For example, write commands may be first issued by the host processor 504 to set up the offloaded data and/or instructions in the memory chip 304(0)-304(M−1) of the addressed processor 306(0)-306(M−1) to be processed. Then, the host processor 504 can be configured to issue a control command to the addressed processor 306(0)-306(M−1) to know when to start processing the offloaded data. The address space in each memory chip 304(0)-304(M−1) could have a reserved memory entry at a designated memory address that holds a control/status register to track a command by a host processor 504 to an addressed processor 306(0)-306(M−1) to begin offload processing through a write command. The control/status register can also allow the addressed processor 306(0)-306(M−1) to signify the execution status back to the host processor 504 through a memory read access to the control/status register.

Figure 6D:
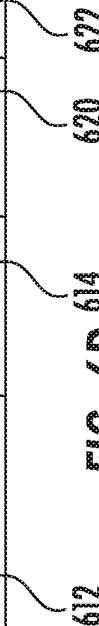

In this regard, FIG. 6D illustrates an exemplary control/status register command word format 618 that can follow the limitations of the address/control word format 602 in FIG. 6B. The control/status register command word format 618 can include the tag field 610, the address space bit field 612, and the processor identifier field 614 like in the command address/control word format 608. The control/status register command word format 618 includes an execution status field 620 that can be written by a processor 306(0)-306(M−1) to indicate an execution completed state as to whether execution of an offloaded process commanded by the host processor 504 is complete or not. For example, a '1' bit may signify completed, and a '0' bit may signify not completed. The control/status register command word format 618 also includes an execution command field 622 that can be set by the host processor 504 when addressing the control/status register of an addressed processor 306(0)-306(M−1) to command execution of an offloaded process by the addressed processor 306(0)-306(M−1) according to an execution state. The execution state can be to execute or not execute, for example. For example, a '1' bit may signify to execute, and a '0' bit may signify to not execute.

The host processor 504 may be configured to first issue a control command at the address of the control/status register of an addressed processor 306(0)-306(M−1) according to the control/status register command word format 618 to first set the execution state in the execution command field 622 to not execute before offloading data and/or instructions to the processor 306(0)-306(M−1). Then, after the offloading of data and/or instructions to the processor 306(0)-306(M−1) is completed by the host processor 504, the host processor 504 can issue a control command at the address of the control/status register of an addressed processor 306(0)-306(M−1) according to the control/status register command word format 618 to set the execution state in the execution command field 622 to execute.

Figure 7:
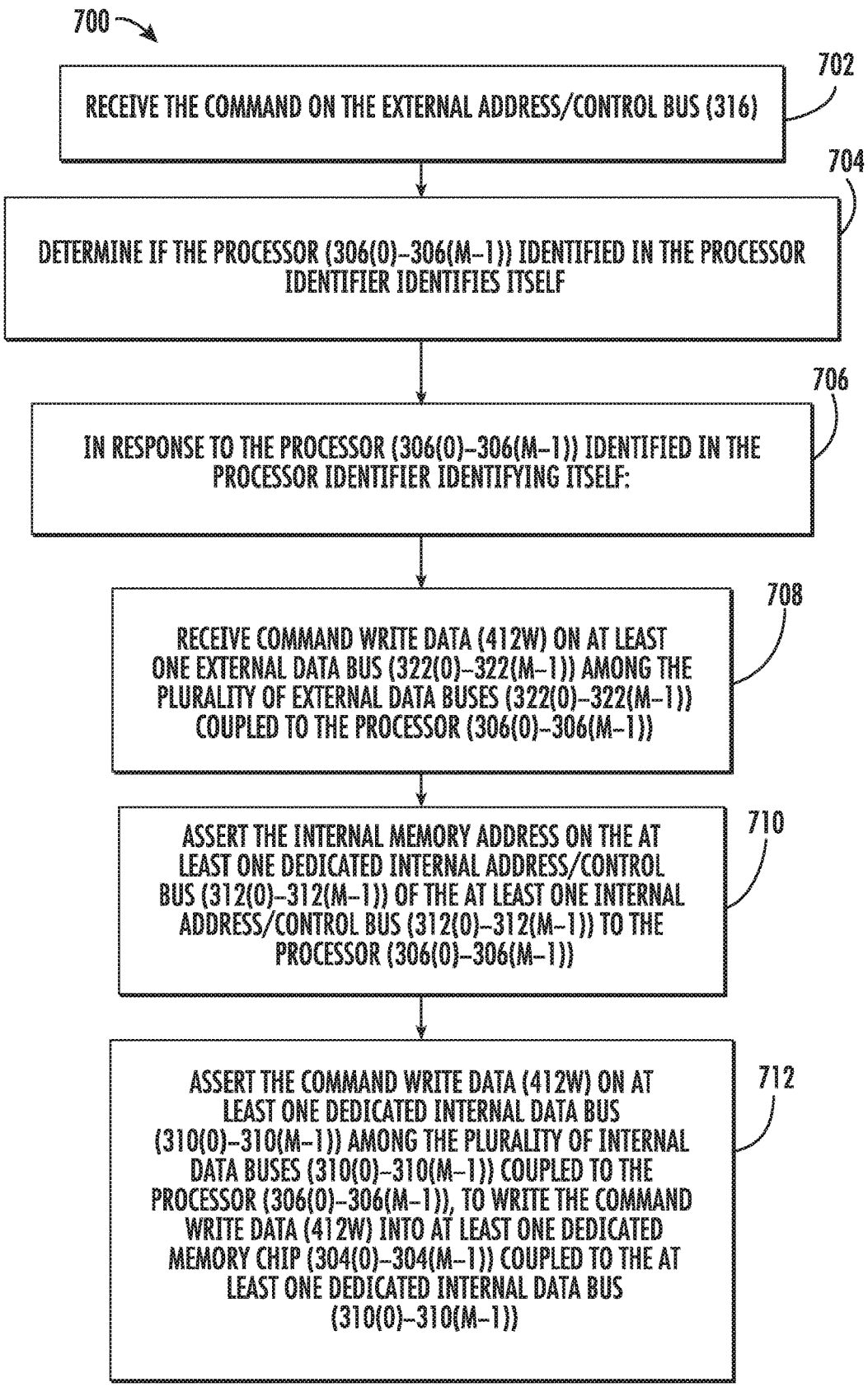
FIG. 7 is a flowchart illustrating an exemplary process of an embedded processor in the IMM computing node in FIG. 5 receiving a command from a host processor to perform offloaded processing in the IMM computing node.

FIG. 7 is a flowchart illustrating an exemplary process 700 of a processor 306(0)-306(M−1) in the IMM computing node 300 in FIG. 5 receiving a command from the host processor 504 to perform offloaded processing in the IMM computing node 300 in an offload computing mode. Each processor 306(0)-306(M−1) in the IMM computing node 300 can perform this process in this example. In this regard, the processors 306(0)-306(M−1) receive the command issued by the host processor 504 on the external address/control bus 316 (block 702 in FIG. 7). Each processor 306(0)-306(M−1) determines if the processor 306(0)-306(M−1) identified in the processor identifier of the command identifies itself (block 704 in FIG. 7). The processor identifier can identify one or more multiple processors 306(0)-306(M−1) since in this example, the external address/control bus 316 is a shared bus. In one example, the command from the host processor 504 to perform offloaded processing in the IMM computing node 300 would identify at least one processor 306(0)-306(M−1) since the host processor 504 would not otherwise issue the command if an offload processing to the IMM computing node 300 were not desired. In another example, if the host processor 504 is configured to identify other processors in other IMM computing nodes that also shared the same external address/control bus 316, the processor identified in the processor identifier of the command issued by the host processor 504 may not identify any processor 306(0)-306(M−1) in the IMM computing node 300.

With continuing reference to FIG. 7, if a processor 306(0)-306(M-1) identifies itself in the processor identifier of the command (block 706 in FIG. 7), the identified processor 306(0)-306(M-1) receives the receive command write data 412W (see FIG. 4) on the external data bus 322(0)-322(M-1) coupled to the processor 306(0)-306(M-1) (block 708 in FIG. 7). The identified processor 306(0)-306(M-1) asserts the internal memory address in the received command on its dedicated internal address/control bus 312(0)-312(M-1) to be received by its dedicated memory chip 304(0)-304(M-1) (block 710 in FIG. 7). The processor 306(0)-306(M-1) also asserts the command write data 412W provided by the host processor 504 on the external data bus 322(0)-322(M-1) of the IMM computing node 300 coupled to the identified processor 306(0)-306(M-1) to cause the identified processor 306(0)-306(M-1) to assert the command write data 412W onto its dedicated internal data bus 310(0)-310(M-1) to be written into its dedicated memory chip 304(0)-304(M-1) (block 712 in FIG. 7).

FIG. 8 is an exemplary computer software code listing 800 that can be programmed and executed in the host processor 504 in FIG. 5 for offloading data and computer software instructions to a designated processor 306(0)-306(M-1) in the IMM computing node 300 in FIG. 5. The offloaded data is loaded by the designated processor 306(0)-306(M-1) into its dedicated interfaced memory chip 304(0)-304(M-1) to be used for performing offloaded processing. In this regard, a first line 802 in the software code listing 800 is to set up a pointer address (*offload_data) to the address space in the designated processor 306(0)-306(M-1) to offload data into its memory chip 304(0)-304(M-1). A "for" loop 804 is next performed to write the offload data to the memory chip 304(0)-304(M-1) of the designated processor 306(0)-306(M-1). A third line 806 in the software code listing 800 is to set up a pointer address (*offload_program) to the address space in the designated processor 306(0)-306(M-1) to offload software instructions into its memory chip 304(0)-304(M-1) to executed for offload processing. A "for" loop 808 is next performed by the host processor 504 to issue a write command to write the offload program instructions to the memory chip 304(0)-304(M-1) of the designated processor 306(0)-306(M-1) at the address of the offload program. A next line 810 in the software code listing 800 control/status register (csr) of the designated processor 306(0)-306(M-1) is then executed to issue a control command with a tag in the tag field 610 and address space in the address space bit field 612 to start offload processing according to command address/control word format 608 according to the processor identifier (Processor_on_IMM) set. A while loop 812 is then executed by the host processor 504 to wait until the designated processor 306(0)-306(M-1) completes the offload execution indicated by the command execution status set in the execution status field 620 (csr_done_bit_not_set). A "for" loop 814 is next performed by the host processor 504 to issue a read command to the designated processor 306(0)-306(M-1) in the IMM computing node to obtain the data results of the offload processing.

The host processor 504 can also be configured to issue memory access requests in a transparent mode to access the memory chips 304(0)-304(M-1) in the IMM computing mode as system memory. In this regard, the processors 306(0)-306(M-1) that receive such memory access requests from the host processor 504 can simply forward such requests to their respective memory chips 304(0)-304(M-1). The processors 306(0)-306(M-1) in the IMM computing node 300 can be configured to access the memory chips 304(0)-304(M-1) in parallel in a striped data format. The processors 306(0)-306(M-1) in the IMM computing node 300 can also be configured to access the memory chips 304(0)-304(M-1) individually where each memory chip 304(0)-304(M-1) has its own address space that is not striped across other memory chips 304(0)-304(M-1).

In this regard, the host processor 504 in FIG. 5 can be configured to issue a command that includes an access mode of a transparent mode to access the memory chips 304(0)-304(M-1) in an IMM computing node 300 as system memory. The command issued by the host processor 504 can indicate an access mode to each of the processors 306(0)-306(M-1) in the IMM computing node 300 at a provided external memory address asserted on the external address/control bus 316. In response to a mode indicator of the command indicating the transparent access mode, the processors 306(0)-306(M-1) can access their dedicated memory chips 304(0)-304(M-1) by asserting the external memory address to be accessed on their internal address/control buses 312(0)-312(M-1). For a read memory access, the processors 306(0)-306(M-1) are configured to assert the read data asserted by the memory chips 304(0)-304(M-1) on the internal data buses 310(0)-310(M-1) to their external data buses 322(0)-322(M-1) to be provided back to the host processor 504. For a write memory access, the processors 306(0)-306(M-1) are configured to assert write data asserted by the host processor 504 on the external data buses 322(0)-322(M-1) to be received by the processors 306(0)-306(M-1) to be asserted on the internal data buses 310(0)-310(M-1) to be written into the memory chips 304(0)-304(M-1) at the address space of the external memory address asserted by the host processor on the external address/control bus 316.

Figure 9:
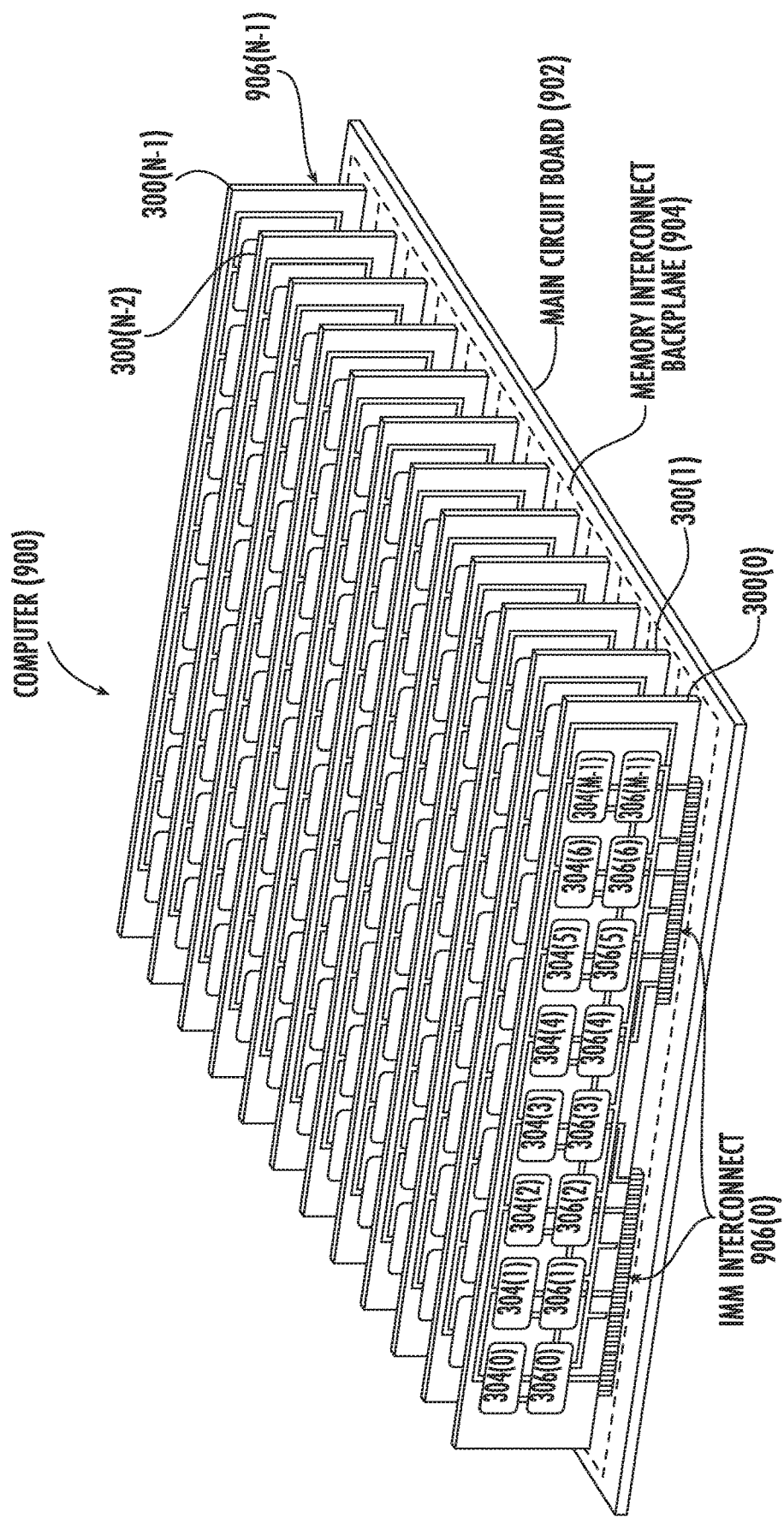
FIG. 9 is a diagram of an exemplary computer that includes a plurality of the IMM computing nodes in FIG. 3 mounted to a main circuit board.

A computer can be provided that includes a plurality of the IMM computing nodes 300 in FIG. 3 as additional offload computing power desired for a host processor, such as the host processor 504 in FIG. 5. For example, FIG. 9 illustrates an exemplary computer 900 that includes 'N' number of IMM computing nodes 300(0)-300(N-1) like the IMM computing node 300 in FIG. 3. The computer 900 includes a main circuit board 902 that includes a memory interconnect backplane 904. The interconnect backplane 904 could be coupled to a host processor as an example to exchange bus traffic commands, including the commands described above with the computer 900 serving as an offload computer. The main circuit board 902 includes 'N' number of IMM interconnects 906(0)-906(N-1) that are sockets coupled to the memory interconnect backplane 904 and are configured to receive signals asserted on the memory interconnect backplane 904. Each IMM computing node 300(0)-300(N-1) is coupled to a respective IMM interconnect 906(0)-906(N-1) to couple the IMM computing nodes 300(0)-300(N-1) to the memory interconnect backplane 904. A host processor or other external processor (not shown) coupled to the memory interconnect backplane 904 can also be configured to designate a particular IMM computing node 300(0)-300(N-1) to perform offload processing as well as a particular processor 306(0)-306(M-1) within the designated IMM computing node 300(0)-300(N-1).

In one example, to facilitate control commands to allow a host processor to designate a particular IMM computing node 300(0)-300(N-1) in the computer 900 in FIG. 9 configured as an offload computer, as well to particular processors 306(0)-306(M-1) to perform offload processing, the command address/control word format 608 in FIG. 6C and the control/status register command word format 618 can be modified to also include the ability to designate a particular IMM computing node 300(0)-300(N−1). In this regard, FIG. 10A illustrates a command address/control word format 1000 that can be used by the host processor 504 to issue a command to a processor 306(0)-306(M−1) in the IMM computing node 300 to perform offloaded processing. The fields that are shared between the command address/control word format 1000 in FIG. 10A and the command address/control word format 608 in FIG. 6C are shown with the same element numbers and are not re-described. The command address/control word format 1000 in FIG. 10A includes an additional field as the IMM identifier field 1002 that allows identification of a particular IMM computing node, such as an IMM computing node 300(0)-300(N−1) in the offload computer 900 in FIG. 9.

Alternatively, the IMM identifier field 1002 could be provided as part of the processor identifier field 614 as one field in the command address/control word format 1000. As another alternative, the IMM identifier field 1002 could be left out of the command address/control word format 1000 if a processor 306(0)-306(M−1) in an IMM computing node 300(0)-300(N−1) could be uniquely identified without an explicit reference to an IMM computing node 300(0)-300(N−1). For example, every processor 306(0)-306(M−1) in an IMM computing node 300(0)-300(N−1) may have a unique identifier among identifiers 0-((M×N)−1) in this example that is unique across multiple IMM computing nodes 300(0)-300(N−1).

FIG. 10B illustrates an exemplary control/status register command word format 1004 that is similar to the control/status register command word format 618 in FIG. 6D. The fields that are shared between the control/status register command word format 1004 in FIG. 10B and the command address/control word format 608 in FIG. 6D are shown with the same element numbers and are not re-described. The control/status register command word format 1004 in FIG. 10B includes an additional field as the IMM identifier field 1006 that allows identification of a particular IMM computing node, such as an IMM computing node 300(0)-300(N−1) in the offload computer 900 in FIG. 9 when writing and reading a control/status register in a processor 306(0)-306(M−1) of an IMM computing node 300.

FIG. 11 is an exemplary computer software code listing 1100 that can be programmed and executed in the host processor 504 in FIG. 5 for offloading data and computer software instructions to a designated processor(s) 306(0)-306(M−1) in a designated IMM computing node 300(0)-300(N−1) in the offload computer 900 in FIG. 9, as an example. The computer software code listing 1100 in this example is written to write offload data to be executed by each of the processors 306(0)-306(M−1) in each of the IMM computing nodes 300(0)-300(N−1) in the offload computer 900 in FIG. 9.

In this regard, nested "for" loops 1102, 1104 are provided to issue commands to each of the IMM computing nodes 300(0)-300(N−1) and then to each of the processors 306(0)-306(M−1) in each IMM computing node 300(0)-300(N−1). For a given processor 306(0)-306(M−1) in a given IMM computing node 300(0)-300(N−1), a line 1108 in the software code listing 1100 is to setup a pointer address (*data) to the address space in the designated processor 306(0)-306(M−1) to offload data into its memory chip 304(0)-304(M−1). A "for" loop 1110 is next performed to write the offload data to the memory chip 304(0)-304(M−1) of the designated processor 306(0)-306(M−1). A next line 1112 in the software code listing 1100 is to set up a pointer address (*node_program) to the address space in the designated processor 306(0)-306(M−1) to offload software instructions into its memory chip 304(0)-304(M−1) to execute for offload processing. A "for" loop 1114 is next performed by the host processor 504 to issue a write command to write the offload program instructions to the memory chip 304(0)-304(M−1) of the designated processor 306(0)-306(M−1) at the address of the *node_program.

A next "for" loop 1116 is used to set the control/status register in each of the processors 306(0)-306(M−1) for each of the IMM computing nodes 300(0)-300(N−1). In this regard, a next line 1120 in the software code listing 1100 writes the control/status register (csr) of the designated processor 306(0)-306(M−1) for the designated IMM computing node 300(0)-300(N−1) to issue a control command with a tag in the tag field 610 and address space in the address space bit field 612 to start offload processing according to control/status register command word format 1004 according to the processor identifier (Processor_on_IMM) set. A "while" loop 1122 is then executed by the host processor 504 to wait until each processor 306(0)-306(M−1) in each IMM computing node 300(0)-300(N−1) completes offload execution indicated by the command execution status set in the execution status field 620 (csr_done_bit_not-_set). A "for" loop 1124 is next performed by the host processor 504 to issue a read command to each of the processors 306(0)-306(M−1) for each of the IMM computing nodes 300(0)-300(M−1) to obtain the data results of the offload processing.

Figure 12:
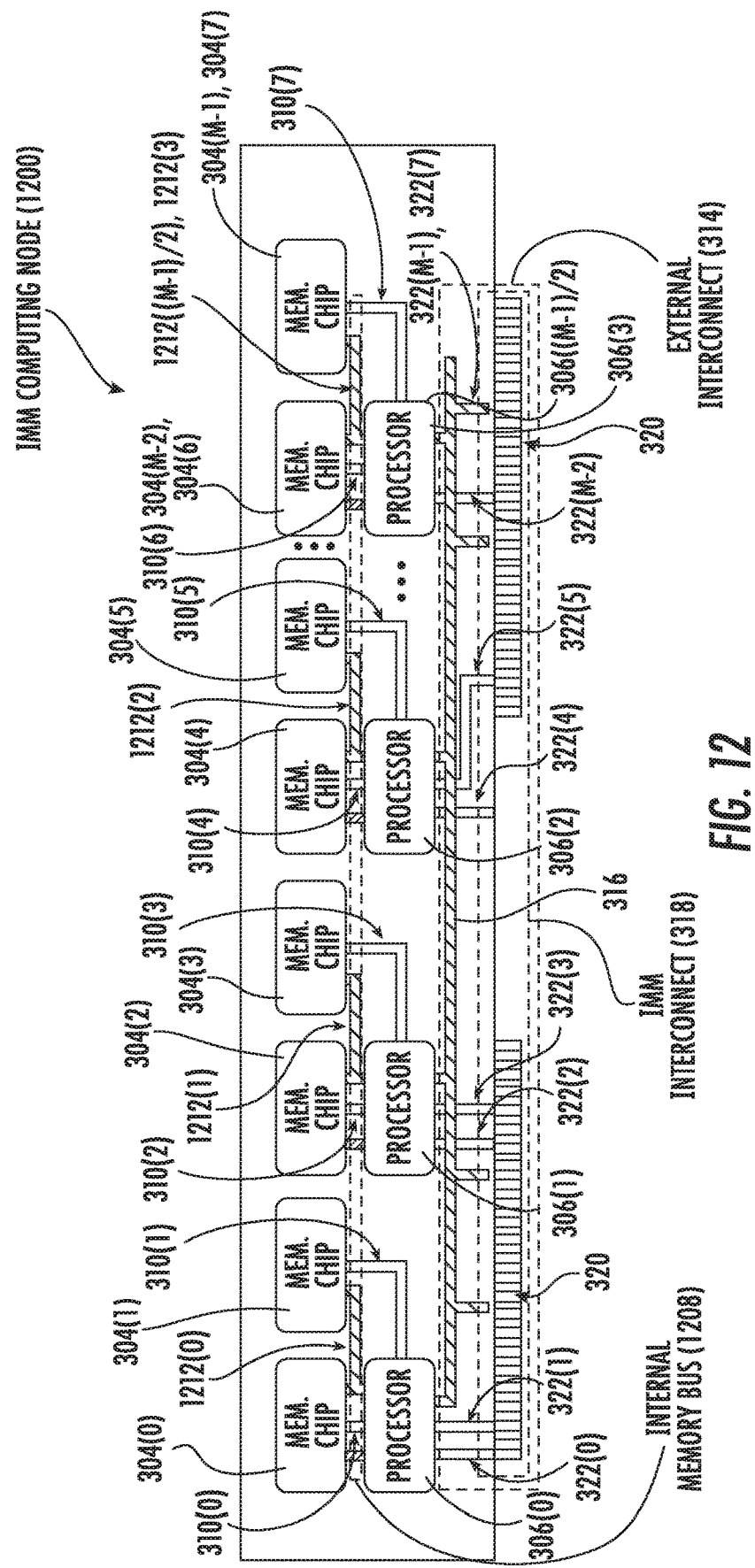
FIG. 12 is a diagram of another exemplary IMM computing node that includes a plurality of memory chips and embedded processors each associated with a respective interfaced memory chip(s) to perform offloaded memory-based tasks.

FIG. 12 is a diagram of another exemplary IMM computing node 1200 similar to the IMM computing node 300 in FIG. 3 that can be used for offload processing. Common elements between the IMM computing node 1200 in FIG. 12 and the IMM computing node 300 in FIG. 3 are shown with common element numbers in FIG. 12 and are not re-described. As shown in FIG. 12, pairs of memory chips 304(0)-304(M−1) are coupled to a common processor 306(0)-306((M−1)/2) and a common internal address/control bus 1212(0)-1212((M−1)/2) as part of an internal memory bus 1208. Take memory chips 304(0), 304(1) as an example: both memory chips 304(0), 304(1) are coupled to processor 306(0) and share a common internal address/control bus 1212(0). This is possible in this example without increasing memory access latency because of the particular memory chips 304(0), 304(1) being DDR memory chips where their respective internal data buses 310(0), 310(1) can be double pumped by its respective processor 306(0). That is, two (2) data bits are transferred in each clock cycle—one (1) bit on each edge of the clock signal. However, the internal address/control bus 1212(0) operates at half the frequency of the internal data buses 310(0), 310(1) in this example. During an 8 B burst over four (4) clock signals, address/control information can be separately asserted even with the shared internal address/control bus 1212(0) for each memory chip 304(0), 304(1). Therefore, one internal address/control bus 1212(0) can provide separate address and control information to keep the two (2) memory chips 304(0), 304(1) busy even though both memory chips 304(0), 304(1) can be accessed individually by the processor 306(0) to provide a theoretical maximum data bandwidth with an 8 B burst. Note that the IMM computing node 1200 and its processors 306(0)-306((M−1)/2) can support transparent and offload computing modes, including any of the transparent and offload computing modes described above.

Figure 13:
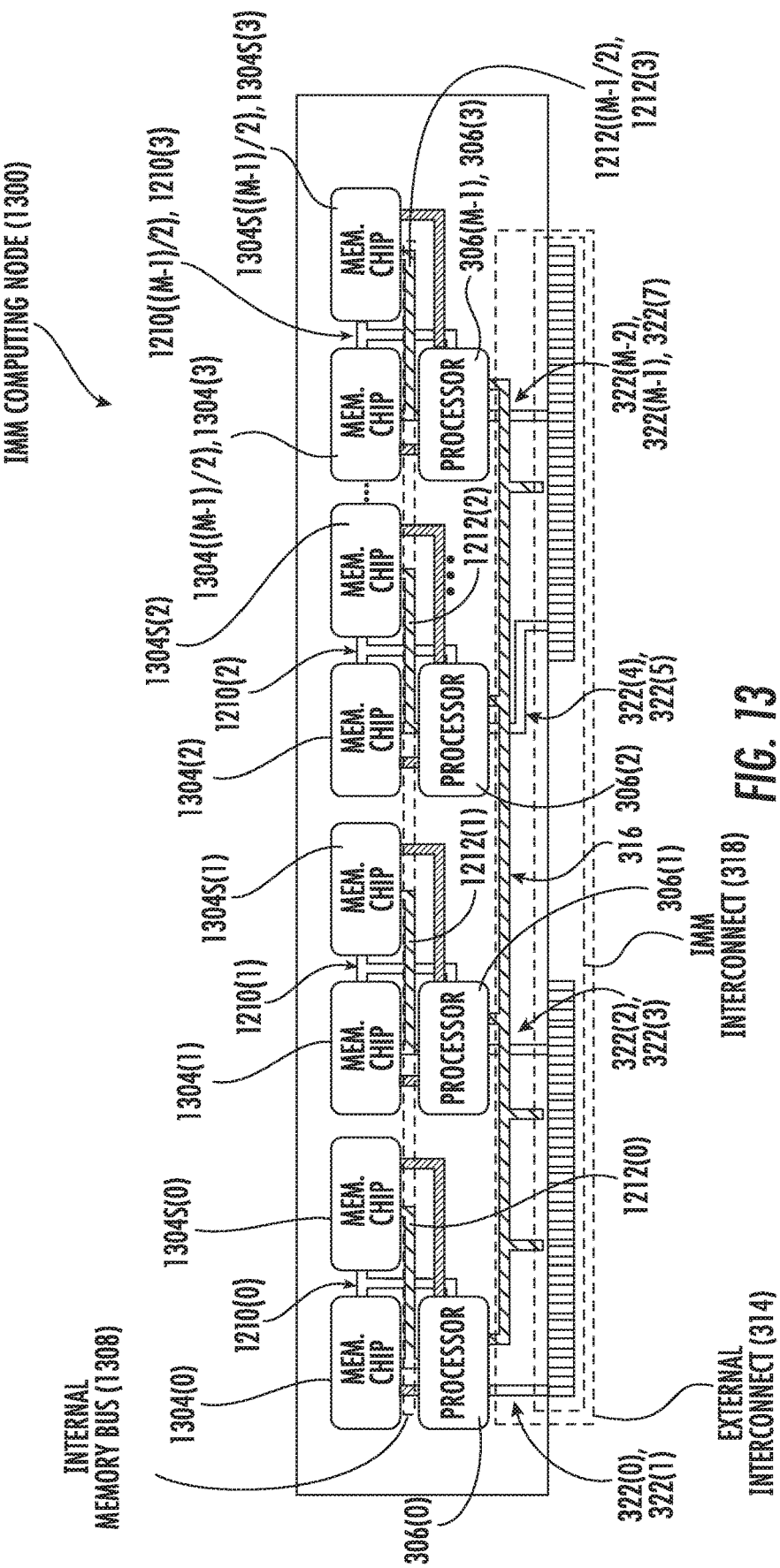
FIG. 13 is a diagram of another exemplary IMM computing node that includes a plurality of primary memory chips having a shadow memory chip(s) and embedded processors each associated with a respective interfaced primary memory chip(s) to perform offloaded memory-based tasks.

FIG. 13 is a diagram of another exemplary IMM computing node 1300 that includes a plurality of primary memory chips 1304(0)-1304((M−1)/2) each having a shadow memory chip 1304S(0)-1304S((M−1)/2) interfaced to respective processors 306(0)-306((M−1)/2) to perform offloaded memory-based tasks. Common elements between the IMM computing node 1300 in FIG. 13 and the IMM computing node 1200 in FIG. 12 are shown with common element numbers in FIG. 13 and are not re-described. Shadowed memory chips in this example means that one or more shadow memory chips 1304S(0)-1304S((M−1/2) and its respective primary memory chip 1304(0)-1304((M−1)/2) share the same data bus, but have separate chip selects as part of an address control bus. Thus, each primary memory chip 1304(0)-1304((M−1)/2) and its shadow memory chip(s) 1304S(0)-1304S((M−1)/2) can be accessed as a separate memory rank for accessing and storing data. Memory capacity is increased with shadowed memory chips, but without an increase in data bus bandwidth since the data bus is shared between the shadowed memory chips.

As shown in FIG. 13, each primary memory chip 1304(0)-1304((M−1)/2) has a respective shadow memory chip 1304S(0)-1304S((M−1)/2) in this example. The primary memory chips 1304(0)-1304((M−1)/2) and their respective shadow memory chips 1304S(0)-1304S((M−1)/2) are coupled to the shared respective internal address/control buses 1212(0)-1212((M−1)/2) as part of an internal memory bus 1308. Further, the primary memory chips 1304(0)-1304((M−1)/2) and their respective shadow memory chips 1304S(0)-1304S((M−1)/2) are also coupled to the same shared respective internal data buses 1210(0)-1210((M−1)/2). Providing shadow memory chips increases memory capacity but does not increase impacting memory bandwidth since the internal data buses 1210(0)-1210((M−1)/2) are shared between the respective primary memory chips 1304(0)-1304((M−1)/2) and their respective shadow memory chips 1304S(0)-1304S((M−1)/2). Note that the IMM computing node 1300 and its processors 306(0)-306((M−1)/2) can support transparent and offload computing modes, including any of the transparent and offload computing modes described above.

Figure 14:
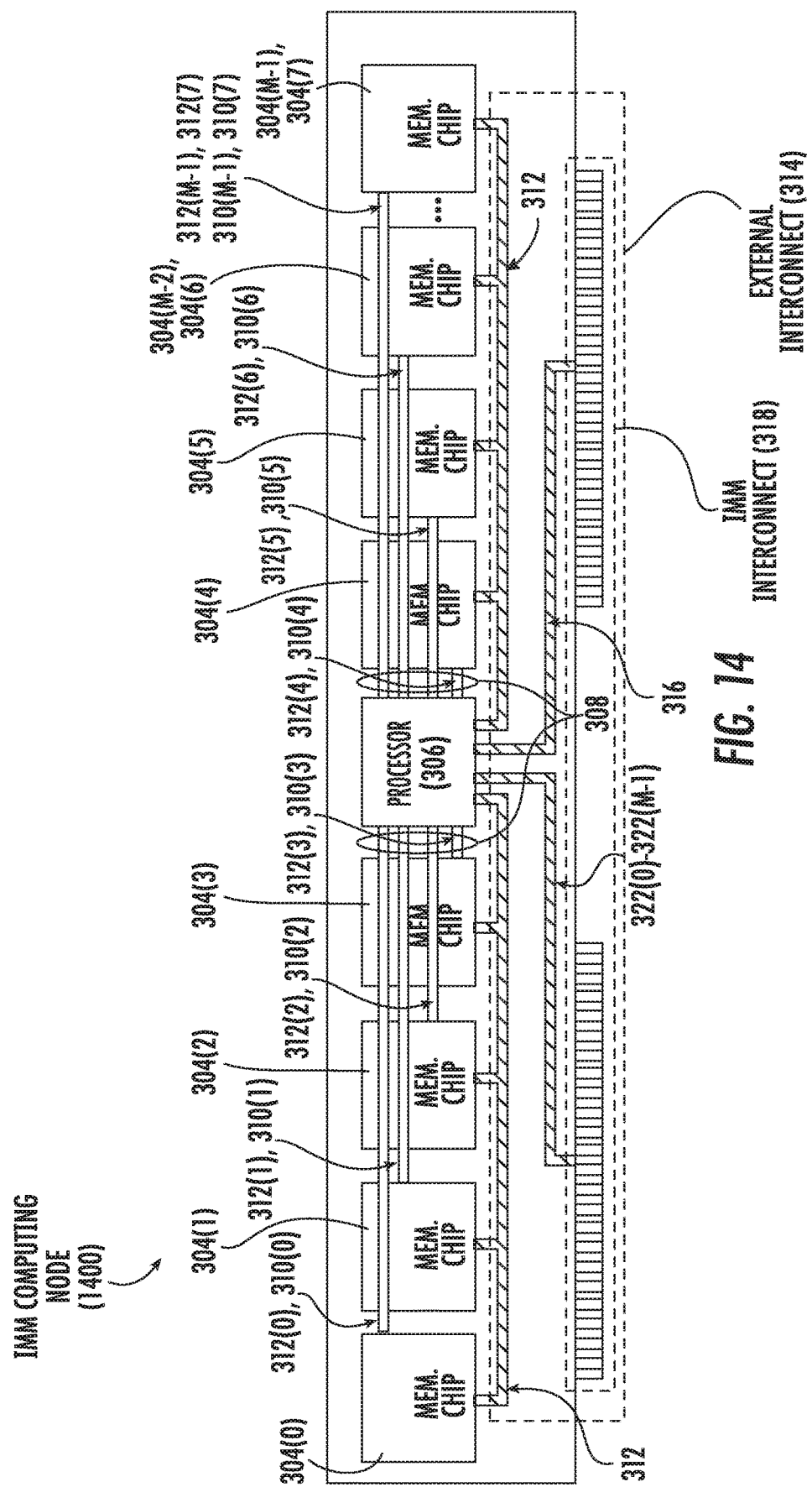
FIG. 14 is a diagram of another exemplary IMM computing node that includes a single embedded processor faced to a plurality of memory chips to perform offloaded memory-based tasks.

FIG. 14 is a diagram of another exemplary IMM computing node 1400 that includes a single embedded processor 306 interfaced to the plurality of memory chips 304(0)-304(M−1) like included in the IMM computing node 300 in FIG. 3 to perform offloaded memory-based tasks. The IMM computing node 1400 in FIG. 14 is similar to the IMM computing node 300 in FIG. 3 except that the IMM computing node 1400 in FIG. 14 includes a single processor 306 to provide an interface between the external interconnect 314 and the memory chips 304(0)-304(M−1). Common elements between the IMM computing node 1400 in FIG. 14 and the IMM computing node 300 in FIG. 3 are shown with common element numbers in FIG. 14 and are not re-described.

The processor 306 can be configured to perform local processing onboard the IMM computing node 1400 using its interfaced memory chips 304(0)-304(M−1) in the IMM computing node 1400 as memory. The IMM computing node 1400 can be interfaced to an external CPU or other system to allow the CPU or other system to offload processing onto the IMM computing node 1400 as an offloading engine for efficiency reasons and improve overall performance through reduced memory access latency. To couple the memory chips 304(0)-304(M−1) to the processor 306, the IMM computing node 1400 includes the internal memory bus 308. The internal memory bus 308 includes an 'M' number of internal data buses 310(0)-310(M−1) for each respective memory chip 304(0)-304(M−1) in a parallel configuration. The internal memory bus 308 also includes 'M' number of internal address/control buses 312(0)-312(M−1) to provide a non-shared, dedicated internal address/control bus 312(0)-312(M−1) for each memory chip 304(0)-304(M−1). The internal address/control buses 312(0)-312(M−1) allow each respective processor 306 to control and address memory accesses to each memory chip 304(0)-304(M−1) in this example. Thus, the processor 306 is coupled to and interfaced with each memory chip 304(0)-304(M−1) through the respective internal address/control buses 312(0)-312(M−1) and internal data buses 310(0)-310(M−1). This allows the processor to use the respective memory chips 304(0)-304(M−1) as memory for processing tasks performed by the processor 306 onboard the IMM computing node 300. Note that the IMM computing node 1400 and its processor 306 can support transparent and offload computing modes, including any of the transparent and offload computing modes described above.

IMM computing nodes having an embedded processor(s) to support local processing of memory-based operations for lower latency and reduced power consumption may be provided in or integrated into any processor-based device. Examples, without limitation, include a head-mounted display, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 15:
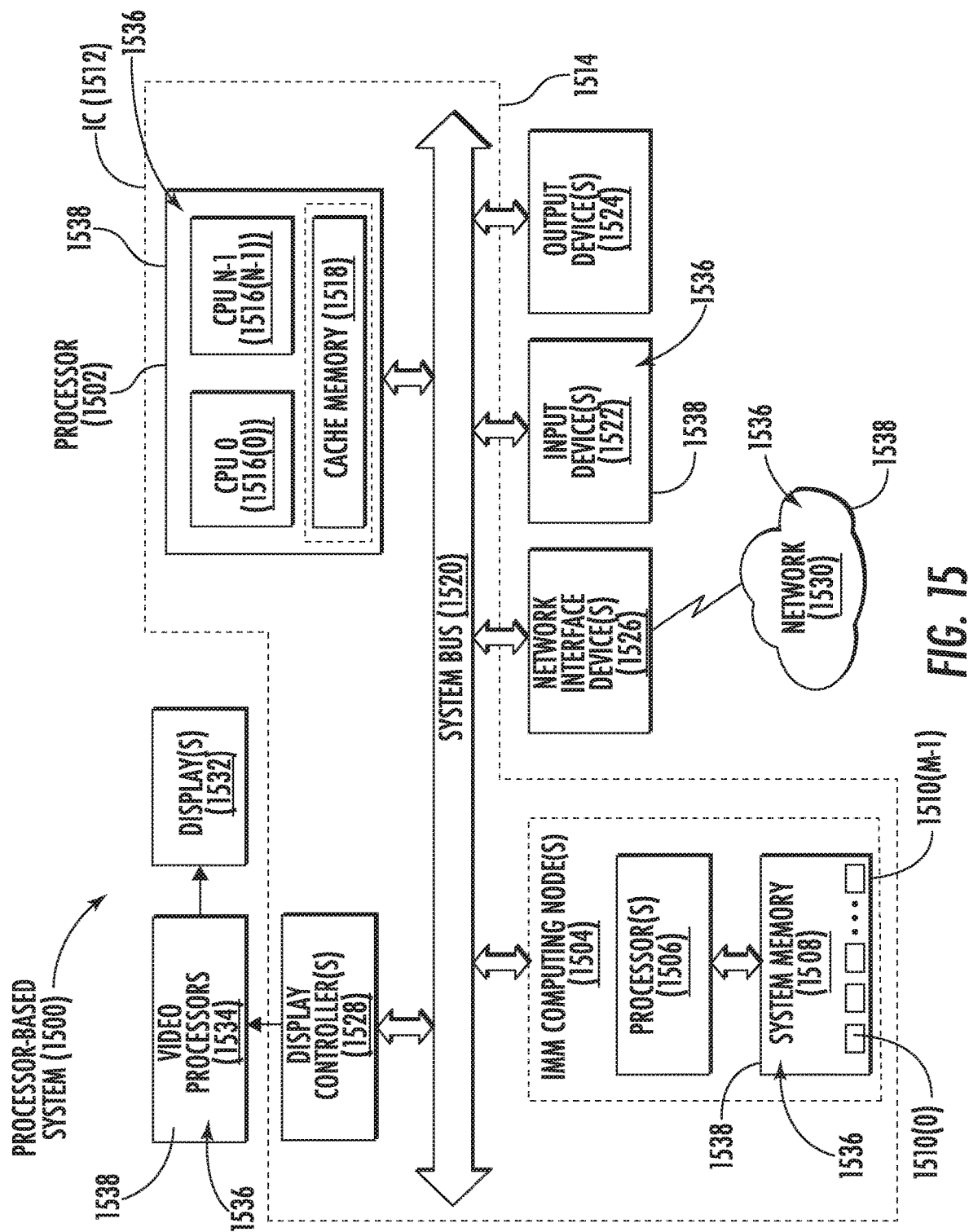
FIG. 15 is a block diagram of an exemplary processor-based system that includes a CPU with a processor that includes a memory system that includes a memory controller, cache memory, and system memory provided in one or more IMM computing nodes, including but not limited to the IMM computing nodes in FIGS. 3-5, 9, and 12-14.

In this regard, FIG. 15 illustrates an example of a processor-based system 1500 that can include a processor 1502 configured to issue memory access requests and offloading commands to one or more IMM computing node(s) 1504. The IMM computing node(s) 1504 can include, but is not limited to, the IMM computing nodes 300, 1200, 1300, and 1400 in FIGS. 3-5, 9, and 12-14, respectively. The IMM computing node(s) 1504 includes one or more processor(s) 1506 that are interfaced to a system memory 1508 that can include a number of memory chips 1510(0)-1510(M−1). The processor(s) 1506 is configured to forward memory access requests from the processor 1502 to the system memory 1508 in transparent mode and forward commands for offloaded processing to the processor(s) in an offload computing mode.

In this example, the processor-based system 1500 is provided in an IC 1512. The IC 1512 may be included in or provided as a system on a chip (SoC) 1514. The processor 1502 includes one or more CPU cores 1516(0)-1516(N−1) and a cache memory 1518 which is coupled to the CPU cores(s) 1516(0)-1516(N−1) for rapid access to temporarily stored data. The processor 1502 is coupled to a system bus 1520 and can intercouple master and slave devices included in the processor-based system 1500. The processor 1502 communicates with these other devices by exchanging address, control, and data information over the system bus 1520. Although not illustrated in FIG. 15, multiple system buses 1520 could be provided, wherein each system bus 1520 constitutes a different fabric. For example, the processor 1502 can communicate bus transaction requests to the memory system 1504 as an example of a slave device.

Other master and slave devices can be connected to the system bus 1520. As illustrated in FIG. 15, these devices can include the IMM computing node(s) 1504 and one or more input devices 1522. The input device(s) 1522 can include any type of input device, including, but not limited to, input keys, switches, voice processors, etc. The other devices can also include one or more output devices 1524, and one or more network interface device(s) 1526 to audio, video, other visual indicators, etc. The other devices can also include one or more display controller(s) 1528 as examples. The network interface device(s) 1526 can be any device(s) configured to allow exchange of data to and from a network 1530. The network 1530 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1526 can be configured to support any type of communications protocol desired.

The processor 1502 may also be configured to access the display controller(s) 1528 over the system bus 1520 to control information sent to one or more display(s) 1532. The display controller(s) 1528 sends information to the display(s) 1532 to be displayed via one or more video processors 1534, which process the information to be displayed into a format suitable for the display(s) 1532. The display(s) 1532 can include any type of display, including, but not limited to, a cathode ray tube (CRT), a liquid crystal display (LCD), a plasma display, etc.

The processor-based system 1500 in FIG. 15 may include a set of instructions 1536 configured to be executed by the processor 1502. The instructions 1536 may be stored in the system memory 1508, the processor 1502, the input device 1522, the video processor(s) 1534, and the network 1530 as examples of non-transitory computer-readable medium 1538. The processor(s) 1506 may also be configured to execute instructions 1536 to access the memory chips 1510(0)-1510(M−1) in the system memory 1508 for offload computing and/or transparent mode processing, and according to any of the aspects disclosed above and herein.

While the computer-readable medium 1538 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" can also include any medium that is capable of storing, encoding, or carrying a set of instructions for execution by the processing device and that cause the processing device to perform any one or more of the methodologies of the embodiments disclosed herein. The term "computer-readable medium" includes, but is not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design states imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random-Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An in-line memory module (IMM) computing node comprising a circuit board, comprising:
   a plurality of memory chips;
   an internal memory bus, comprising:
      a plurality of internal data buses each coupled to a dedicated memory chip among the plurality of memory chips in a parallel configuration; and
      at least one internal address/control bus coupled to the plurality of memory chips;
   a processor coupled to the at least one internal address/control bus and coupled to the plurality of internal data buses, to interface with the plurality of memory chips; and
   an external interconnect, comprising:
      a plurality of external data buses each assigned to a memory chip among the plurality of memory chips and coupled to the processor; and
      an external address/control bus coupled to the processor.

2. The IMM computing node of claim 1, wherein the processor is coupled to a processor bus.

3. The IMM computing node of claim 1, wherein:
   the at least one internal address/control bus comprises a plurality of dedicated internal address/control buses each coupled to a dedicated memory chip among the plurality of memory chips; and
   the processor is coupled to the plurality of dedicated internal address/control buses and is coupled to an internal data bus that is coupled to the dedicated memory chip coupled to the dedicated internal address/control bus.

4. The IMM computing node of claim 1, wherein:
   the at least one internal address/control bus comprises an internal address/control bus coupled to each of the plurality of memory chips; and
   the processor is coupled to the internal address/control bus and the plurality of internal data buses.

5. The IMM computing node of claim 4, wherein:
   the plurality of memory chips comprises a plurality of primary memory chips; and
   further comprising:
      one or more shadow memory chips dedicated to each primary memory chip among the plurality of primary memory chips; and
   wherein:
      each of the one or more shadow memory chips is coupled to the internal address/control bus; and
      each of the one or more shadow memory chips is coupled to the same internal data bus that is coupled to its dedicated primary memory chip.

6. The IMM computing node of claim 1, wherein the processor is configured to:
   receive a command comprising an external memory address on the external address/control bus; and
   access at least one memory chip among the plurality of memory chips dedicated to the processor through its dedicated internal address/control bus based on the received command.

7. The IMM computing node of claim 6, wherein:
   the command further comprises a mode indicator indicating an access mode; and
   the processor is further configured to:
      determine if the mode indicator of the received command comprises a transparent access mode; and
      in response to the mode indicator of the command indicating the transparent access mode:
         access at least one memory chip among the plurality of memory chips by being configured to assert the external memory address on the dedicated internal address/control bus coupled to the at least one memory chip dedicated to the processor.

8. The IMM computing node of claim 7, wherein:
   the command further comprises a read/write indicator; and
   in response to the mode indicator of the command indicating the transparent access mode, the processor is further configured to:
      determine if the read/write indicator indicates a read request; and
      in response to the read/write indicator indicating a read request:
         receive read data on the at least one dedicated internal data bus from the at least one memory chip; and
         assert the read data from the at least one dedicated internal data bus among the plurality of internal data buses to at least one external data bus coupled to the processor.

9. The IMM computing node of claim 7, wherein:
   the command further comprises a read/write indicator; and
   in response to the mode indicator of the command indicating the transparent access mode, the processor is further configured to:
      determine if the read/write indicator indicates a write request; and
      in response to the read/write indicator indicating a write request:
         receive write data on at least one external data bus among the plurality of external data buses coupled to the processor; and
         assert the write data on at least one dedicated internal data bus among the plurality of internal data buses to be written into the at least one memory chip dedicated to the processor.

10. The IMM computing node of claim 1, wherein the processor is further configured to:
    receive a command comprising an internal memory address on the external address/control bus;
    receive command write data on at least one external data bus among the plurality of external data buses coupled to the processor;
    assert the internal memory address on at least one dedicated internal address/control bus of the at least one internal address/control bus to the processor; and
    assert the command write data on at least one dedicated internal data bus among the plurality of internal data buses coupled to the processor, to write the command write data into at least one dedicated memory chip coupled to the at least one dedicated internal data bus.

11. The IMM computing node of claim 10, wherein the processor is further configured to:
    receive a control command on the external address/control bus, the control command comprising the internal memory address and a command execution indicator indicating a command state;
    receive the command write data on the at least one external data bus among the plurality of external data buses coupled to the processor;
    assert the internal memory address on the at least one dedicated internal address/control bus of the at least one internal address/control bus to the processor; and assert the command write data on the at least one dedicated internal data bus among the plurality of internal data buses coupled to the processor.

12. The IMM computing node of claim 11, wherein the processor is further configured to:
   determine if the command execution indicator in the received control command indicates an execution state; and
   in response to the command execution indicator indicating the execution state:
      assert the internal memory address on the at least one dedicated internal address/control bus of the at least one internal address/control bus to the processor;
      receive read data on the at least one dedicated internal data bus among the plurality of internal data buses coupled to the processor; and
      process the read data as computer instructions comprising accessing the at least one memory chip among the plurality of memory chips coupled to the at least one dedicated internal data bus among the plurality of internal data buses coupled to the processor.

13. The IMM computing node of claim 1 integrated into an integrated circuit (IC).

14. The IMM computing node of claim 1 integrated into a device selected from the group consisting of: a head-mounted device, a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

15. A method of performing a memory access on an in-line memory module (IMM) computing node comprising a circuit board comprising:
   a plurality of memory chips;
   an internal memory bus, comprising:
      a plurality of internal data buses each coupled to a dedicated memory chip among the plurality of memory chips in a parallel configuration; and
      at least one internal address/control bus coupled to the plurality of memory chips;
   a processor coupled to the at least one internal address/control bus and coupled to the plurality of internal data buses to interface with the plurality of memory chips; and
   an external interconnect, comprising;
      a plurality of external data buses each assigned to a memory chip among the plurality of memory chips and coupled to the processor; and
      an external address/control bus coupled to the processor;
   the method comprising the processor:
      receiving a command comprising an external memory address on the external address/control bus; and
      accessing the plurality of memory chips through the at least one internal address/control bus based on the received command.

16. The method of claim 15, further comprising the processor:
   receiving a command comprising an internal memory address on the external address/control bus;
   receiving command write data on at least one external data bus among the plurality of external data buses coupled to the processor;
   asserting the internal memory address on at least one dedicated internal address/control bus of the at least one internal address/control bus to the processor; and
   asserting the command write data on at least one dedicated internal data bus among the plurality of internal data buses coupled to the processor, to write the command write data into at least one dedicated memory chip coupled to the at least one dedicated internal data bus.

17. A computer system, comprising:
   a computer, comprising:
      a main circuit board, comprising:
         a memory interconnect backplane;
         a plurality of in-line memory module (IMM) interconnects coupled to the memory interconnect backplane; and
         a plurality of IMM computing nodes each comprising a circuit board comprising:
            a plurality of memory chips;
            an internal memory bus, comprising:
               a plurality of internal data buses each coupled to a dedicated memory chip among the plurality of memory chips in a parallel configuration; and
               at least one internal address/control bus coupled to the plurality of memory chips;
            a processor coupled to the at least one internal address/control bus and coupled to the plurality of internal data buses to interface with the plurality of memory chips; and
            an external interconnect coupled to an IMM interconnect among the plurality of IMM interconnects, the external interconnect comprising:
               a plurality of external data buses each assigned to a memory chip among the plurality of memory chips and coupled to the processor; and
               an external address/control bus coupled to the processor; and
      a computer bus coupling the host processor to the plurality of IMM interconnects to couple a host processor to the external interconnect of the plurality of IMM computing nodes.

18. The computer system of claim 17, wherein for each IMM computing node of the plurality of IMM computing nodes:
   the at least one internal address/control bus comprises a plurality of dedicated internal address/control buses each coupled to a dedicated memory chip among the plurality of memory chips; and
   the processor is coupled to a dedicated internal address/control bus among the plurality of dedicated internal address/control buses and is coupled to an internal data bus that is coupled to the dedicated memory chip that is coupled to the dedicated internal address/control bus.

19. The computer system of claim 17, wherein for each IMM computing node of the plurality of IMM computing nodes:
   the at least one internal address/control bus comprises an internal address/control bus coupled to each of the plurality of memory chips; and the processor is coupled to the internal address/control bus and the plurality of internal data buses.

20. The computer system of claim 17, wherein the host processor is configured to:
issue a command on the computer bus comprising an IMM computing module identifier identifying an IMM computing node among the plurality of IMM computing nodes and an internal memory address.

21. The computer system of claim 17, further comprising:
a host computer; and
the computer bus coupling the host processor to the plurality of IMM interconnects to couple the host processor to the external interconnect of the plurality of IMM computing nodes.

22. The computer system of claim 21, wherein the processor in each IMM computing node among the plurality of IMM computing nodes is configured to:
receive a command issued by the host processor on the external address/control bus of its external interconnect; and
access at least one memory chip among the plurality of memory chips dedicated to the processor through its dedicated internal address/control bus based on the received command.

* * * * *